United States Patent
Pittel et al.

(10) Patent No.: US 7,755,026 B2
(45) Date of Patent: *Jul. 13, 2010

(54) GENERATING SIGNALS REPRESENTATIVE OF SENSED LIGHT THAT IS ASSOCIATED WITH WRITING BEING DONE BY A USER

(75) Inventors: Arkady Pittel, Brookline, MA (US); Andrew M. Goldman, Stow, MA (US); Stanislav V. Elektrov, Needham, MA (US); Sergey Liberman, Bedford, MA (US)

(73) Assignee: CandleDragon Inc., Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,987

(22) Filed: May 4, 2006

(65) Prior Publication Data

US 2007/0262246 A1 Nov. 15, 2007

(51) Int. Cl.
*G01J 1/04* (2006.01)
(52) U.S. Cl. .................. 250/227.13; 250/221
(58) Field of Classification Search ............ 250/227.13, 250/227.14, 221, 559.29, 208.1; 340/815.53, 340/407.2; 345/179–183, 173; 715/711, 715/754, 773
See application file for complete search history.

(56) References Cited

U.S. PATENT DOCUMENTS

| | | |
|---|---|---|
| 3,376,551 A | 4/1968 | Armbruster |
| 3,559,307 A | 2/1971 | Barrekette et al. |
| 3,581,099 A | 5/1971 | Franke |
| 3,761,170 A | 9/1973 | Genesky et al. |
| 3,801,741 A | 4/1974 | Ablett |
| 3,915,015 A | 10/1975 | Crane et al. |
| 4,124,838 A | 11/1978 | Kiss |
| 4,131,880 A | 12/1978 | Siy et al. |
| 4,550,250 A | 10/1985 | Mueller |
| 4,650,335 A | 3/1987 | Ito et al. |
| 4,682,016 A | 7/1987 | Inoue |
| 4,688,933 A * | 8/1987 | Lapeyre ..................... 356/3.16 |
| 4,705,942 A | 11/1987 | Budrikis et al. |
| 4,710,760 A | 12/1987 | Kasday |
| 4,751,741 A | 6/1988 | Mochinga et al. |
| 4,782,328 A | 11/1988 | Denlinger |
| 4,806,707 A | 2/1989 | Landmeier |
| 4,874,937 A | 10/1989 | Okamoto |

(Continued)

FOREIGN PATENT DOCUMENTS

EP 0 202 468 11/1986

(Continued)

OTHER PUBLICATIONS

Conant, R., et al., "A Raster-Scanning Full-Motion Video Display Using Polysilicon Micromachined Mirrors", *Sensors and Actuators A: Physical*, 83(1):291-296, May 2000.

(Continued)

*Primary Examiner*—Que T Le

(57) ABSTRACT

An array of sensitive pixel elements is configured to generate signals representative of sensed light that is associated with writing being done by a user, and an optical system concentrates light from a light source across a section of the array of sensitive pixel elements, the signals being useful to compute a subpixel measurement of a position of the light source.

65 Claims, 19 Drawing Sheets

U.S. PATENT DOCUMENTS

| | | | |
|---|---|---|---|
| 4,883,926 A | 11/1989 | Baldwin | |
| 4,891,474 A | 1/1990 | Kelly | |
| 4,896,965 A | 1/1990 | Goff et al. | |
| 4,936,683 A | 6/1990 | Purcell | |
| 5,026,153 A | 6/1991 | Suzuki et al. | |
| 5,053,757 A | 10/1991 | Meadows | |
| 5,121,441 A | 6/1992 | Chefalas et al. | |
| 5,166,668 A | 11/1992 | Aoyagi | |
| 5,185,638 A | 2/1993 | Conzola et al. | |
| 5,198,877 A | 3/1993 | Schulz | |
| 5,210,405 A | 5/1993 | Toyoda et al. | |
| 5,215,397 A | 6/1993 | Taguchi et al. | |
| 5,227,622 A | 7/1993 | Suzuki | |
| 5,227,732 A | 7/1993 | Hong | |
| 5,239,139 A | 8/1993 | Zuta | |
| 5,247,137 A | 9/1993 | Epperson | |
| 5,296,838 A | 3/1994 | Suzuki | |
| 5,298,737 A * | 3/1994 | Proper | 250/221 |
| 5,301,222 A | 4/1994 | Fujiwara | |
| 5,308,936 A | 5/1994 | Biggs et al. | |
| 5,313,542 A | 5/1994 | Castonguay | |
| 5,317,140 A | 5/1994 | Dunthorn | |
| 5,347,477 A | 9/1994 | Lee | |
| 5,371,516 A | 12/1994 | Toyoda et al. | |
| 5,434,371 A | 7/1995 | Brooks et al. | |
| 5,453,762 A | 9/1995 | Ito et al. | |
| 5,483,261 A | 1/1996 | Yasutake | |
| 5,517,579 A | 5/1996 | Baron et al. | |
| 5,525,764 A | 6/1996 | Junkins et al. | |
| 5,546,538 A | 8/1996 | Cobbley et al. | |
| 5,548,092 A | 8/1996 | Shriver | |
| 5,572,607 A | 11/1996 | Behrends | |
| 5,587,558 A | 12/1996 | Matsushima | |
| 5,612,720 A | 3/1997 | Ito et al. | |
| 5,629,499 A | 5/1997 | Flickinger et al. | |
| 5,652,412 A | 7/1997 | Lazzouni et al. | |
| 5,661,761 A | 8/1997 | Iwamatsu | |
| 5,793,361 A | 8/1998 | Kahn et al. | |
| 5,805,719 A | 9/1998 | Pare, Jr. et al. | |
| 5,818,424 A | 10/1998 | Korth | |
| 5,825,921 A | 10/1998 | Dulong | |
| 5,831,601 A | 11/1998 | Vogeley et al. | |
| 5,874,947 A | 2/1999 | Lin | |
| 5,900,943 A | 5/1999 | Owen | |
| 5,902,968 A | 5/1999 | Sato et al. | |
| 5,945,981 A | 8/1999 | Paull et al. | |
| 5,963,194 A | 10/1999 | Umeda et al. | |
| 5,996,956 A | 12/1999 | Shawver | |
| 6,014,129 A | 1/2000 | Umeda et al. | |
| 6,038,333 A | 3/2000 | Wang | |
| 6,055,552 A | 4/2000 | Curry | |
| 6,100,538 A | 8/2000 | Ogawa | |
| 6,124,848 A | 9/2000 | Ballare et al. | |
| 6,137,908 A | 10/2000 | Rhee | |
| 6,181,329 B1 | 1/2001 | Stork et al. | |
| 6,191,778 B1 | 2/2001 | Chery et al. | |
| 6,236,753 B1 | 5/2001 | Inamoto | |
| 6,243,165 B1 | 6/2001 | Norita et al. | |
| 6,326,956 B1 | 12/2001 | Jaeger et al. | |
| 6,333,716 B1 | 12/2001 | Pontoppidan | |
| 6,335,727 B1 | 1/2002 | Morishita et al. | |
| 6,344,848 B1 | 2/2002 | Rowe et al. | |
| 6,348,914 B1 | 2/2002 | Tuli | |
| 6,377,238 B1 | 4/2002 | McPheters | |
| 6,392,821 B1 | 5/2002 | Benner, Jr. | |
| 6,414,673 B1 | 7/2002 | Wood et al. | |
| 6,441,362 B1 | 8/2002 | Ogawa | |
| 6,490,563 B2 | 12/2002 | Hon et al. | |
| 6,501,061 B1 | 12/2002 | Kitai et al. | |
| 6,525,715 B2 | 2/2003 | Uchiyama et al. | |
| 6,526,351 B2 | 2/2003 | Whitham | |
| 6,567,078 B2 | 5/2003 | Ogawa | |
| 6,577,299 B1 | 6/2003 | Schiller et al. | |
| 6,614,422 B1 | 9/2003 | Rafii et al. | |
| 6,633,671 B2 | 10/2003 | Munich et al. | |
| 6,647,145 B1 | 11/2003 | Gay | |
| 6,760,009 B2 * | 7/2004 | Omura et al. | 345/157 |
| 6,811,264 B2 | 11/2004 | Raskar et al. | |
| 6,856,349 B1 | 2/2005 | Trevino | |
| 6,897,854 B2 | 5/2005 | Cho et al. | |
| 7,006,134 B1 | 2/2006 | Arai et al. | |
| 7,054,045 B2 | 5/2006 | McPheters et al. | |
| 7,091,959 B1 | 8/2006 | Clary | |
| 2001/0030668 A1 | 10/2001 | Erten et al. | |
| 2002/0031243 A1 | 3/2002 | Schiller et al. | |
| 2002/0118181 A1 | 8/2002 | Sekendur | |
| 2002/0163511 A1 | 11/2002 | Sekendur | |
| 2003/0095708 A1 | 5/2003 | Pittel | |
| 2003/0122804 A1 | 7/2003 | Yamazaki et al. | |
| 2003/0132918 A1 | 7/2003 | Fitch et al. | |
| 2003/0184529 A1 | 10/2003 | Chien et al. | |
| 2005/0073508 A1 | 4/2005 | Pittel et al. | |
| 2005/0128183 A1 | 6/2005 | McGreevy | |
| 2005/0128184 A1 | 6/2005 | McGreevy | |
| 2006/0077188 A1 | 4/2006 | Byun | |
| 2006/0176287 A1 | 8/2006 | Pittel et al. | |
| 2006/0176288 A1 | 8/2006 | Pittel et al. | |
| 2006/0290686 A1 | 12/2006 | Shimizu et al. | |
| 2007/0030258 A1 | 2/2007 | Pittel et al. | 345/179 |
| 2007/0159453 A1 | 7/2007 | Inoue | |
| 2007/0182725 A1 | 8/2007 | Pittel | |
| 2008/0001078 A1 | 1/2008 | Pittel et al. | |
| 2008/0018591 A1 | 1/2008 | Pittel et al. | |
| 2008/0166175 A1 | 7/2008 | Pittel et al. | |

FOREIGN PATENT DOCUMENTS

| | | |
|---|---|---|
| EP | 0 717 368 | 6/1996 |
| EP | 0 865 192 | 9/1998 |
| EP | 0 869 690 | 10/1998 |
| FR | 2 650 904 | 2/1991 |
| JP | A S59-220610 | 12/1984 |
| JP | A S62-211506 | 9/1987 |
| JP | A S62-243022 | 10/1987 |
| JP | A S63-241415 | 10/1988 |
| JP | A H03-196326 | 8/1991 |
| JP | A H07-175585 | 7/1995 |
| JP | 07-200143 | 8/1995 |
| JP | A H07-234105 | 9/1995 |
| JP | A H08-506193 | 7/1996 |
| JP | A H09-319501 | 12/1997 |
| JP | A H10-176910 | 6/1998 |
| JP | A H11-21925 | 1/1999 |
| JP | A H11-84227 | 3/1999 |
| JP | 2000-196326 | 7/2000 |
| WO | WO94/09447 | 4/1994 |
| WO | WO94/18663 | 8/1994 |
| WO | WO95/02163 | 1/1995 |
| WO | WO97/16799 | 5/1997 |
| WO | WO 98/44316 | 10/1998 |
| WO | WO00/11596 | 3/2000 |
| WO | WO01/31570 | 5/2001 |
| WO | WO01/77796 | 10/2001 |
| WO | WO 03/038592 | 5/2003 |
| WO | WO2005/058177 | 6/2005 |

OTHER PUBLICATIONS

Craft, D.J., et al., "Accelerometer Pen", *IBM Technical Disclosure Bulletin*, 16(12):4070, May 1974.

Du, H., et al., "A Virtual Keyboard Based on True-3D Optical Ranging", *Proceedings of the British Machine Vision Conference*, Oxford, U.K., vol. 1, pp. 220-229, Sep. 2005.

Narayanaswamy, S., et al., "Using data on digital cellular and PCS voice networks", *Bell Labs Technical Journal*, 3(2):58-75, Apr. 1998.

Romano, B., "Microsoft's latest is flat-out impressive", *The Seattle Times*, 3 pages, Jul. 19, 2006.

U.S. Appl. No. 11/071,543, filed Apr. 2006, Byun.

Office Action from Japanese Patent Office.

Hhtp://www.wowpen.us/, "Wireless Digital Pen & Mouse", printed Mar. 3, 2008.

Kasabach et al., "Digital Ink: A Familiar Idea with Technological Might!", Conference on Human Factors in Computing Systems, CHI 98 conference summary on Human factors in computing systems, Los Angeles, California, United States, pp. 175-176 , Year of Publication: 1998, ISBN:1-58113-028-7.

International Search Report and Written Opinion mailed Oct. 1, 2008 in corresponding PCT application No. PCT/US07/68104 (13 pages).

International Search Report and Written Opinion mailed Jul. 15, 2008 in corresponding PCT application No. PCT/US07/73576 (11 pages).

International Search Report mailed Oct. 10, 2002 in corresponding PCT application No. PCT/US01/11486 (9 pages).

International Search Report mailed Jun. 9, 2001 in corresponding PCT application No. PCT/US00/29758 (8 pages).

Patent 6,577,299 (U.S. Appl. No. 09/376,837), filed Aug. 18, 1999, including transaction history from PAIR (PTO website).

U.S. Appl. No. 09/698,471, filed Oct. 27, 2000, including application as filed, transaction history from PAIR (PTO website).

U.S. Appl. No. 09/832,340, filed Apr. 10, 2001, including application as filed, transaction history from PAIR (PTO website), and pending claims.

Patent 7, 257,255 (U.S. Appl. No. 09/991,539), filed Nov. 21, 2001, including transaction history from PAIR (PTO website).

Patent 7,268,774 (U.S. Appl. No. 10/623,284), filed Jul. 17, 2003, including transaction history from PAIR (PTO website).

U.S. Appl. No. 11/327,292, filed Jan. 6, 2006, including application as filed, transaction history from PAIR (PTO website), and pending claims.

U.S. Appl. No. 11/327,302, filed Jan. 6, 2006, including application as filed, transaction history from PAIR (PTO website), and pending claims.

U.S. Appl. No. 11/327,303, filed Jan. 6, 2006, including application as filed, transaction history from PAIR (PTO website), and pending claims.

U.S. Appl. No. 11/490,736, filed Jul. 20, 2006, including application as filed, transaction history from PAIR (PTO website), and pending claims.

U.S. Appl. No. 11/620,201, filed Jan. 5, 2007, including application as filed, transaction history from PAIR (PTO website), and pending claims.

U.S. Appl. No. 11/733,411, filed Apr. 10, 2007, including application as filed, transaction history from PAIR (PTO website), and pending claims.

U.S. Appl. No. 11/853,330, filed Sep. 11, 2007, including application as filed, transaction history from PAIR (PTO website), and pending claims.

Office action dated Feb. 10, 2006, for Chinese application No. 00814981.X, filed on Oct. 27, 2000.

Office action dated Aug. 4, 2006, for Chinese application No. 00814981.X, filed on Oct. 27, 2000.

Office action dated Aug. 15, 2008, for Chinese application No. 200710085262.2, filed on Oct. 27, 2000.

Office action dated Feb. 29, 2008, for Japanese application No. 2001-534078, filed on Oct. 27, 2000.

International Preliminary Report on Patentability mailed Nov. 13, 2008 in corresponding PCT application No. PCT/US2007/068104 (10 pages).

International Search Report and Written Opinion mailed Aug. 1, 2008 in corresponding PCT application No. PCT/US2008/50066, Publication No. W02008/086067, published Jul. 17, 2008 (14 pages).

International Preliminary Report on Patentability mailed Jan. 20, 2009 in corresponding PCT application No. PCT/US07/73576, Publication No. WO 2008/011361, published on Jan. 24, 2008 (5 pages).

International Search Report mailed Nov. 3, 1999, in corresponding PCT application No. PCT/US99/18910, Publication No. WO 2000/11596, published on Mar. 2, 2001(2 pages).

International Preliminary Examination Report mailed Feb. 18, 2002 in corresponding PCT application No. PCT/US00/29758 , Publication No. WO2007/131087, published on Nov. 15, 2007 (7 pages).

International Search Report and Written Opinion mailed Jul. 15, 2008 in corresponding PCT application No. PCT/US07/73576, Publication No. WO 2008/011361, published on Jan. 24, 2008. (11 pages).

Office action dated Mar. 24, 2009, for Japanese application No. 566780/2000, filed on Aug. 18, 1999.

* cited by examiner $$a' = a\cos(\alpha) \qquad (1)$$

$$\cos(\alpha) = \frac{a\cos(\alpha) + b'}{a+b} \Rightarrow \cos(\alpha) = \frac{b'}{b} \qquad (2)$$

$$b'^2 = \Delta x_{12}^2 + \Delta y_{12}^2 \Rightarrow \cos^2(\alpha) = \frac{\Delta x_{12}^2 + \Delta y_{12}^2}{b^2} \qquad (3)$$

$$\Delta x_{01}^2 + \Delta y_{01}^2 = a^2 \cos^2(\alpha) \qquad (4)$$

$$\frac{\Delta x_{01}}{\Delta x_{12}} = \frac{\Delta y_{01}}{\Delta y_{12}} \Rightarrow \Delta x_{01} = \Delta y_{01} \frac{\Delta x_{12}}{\Delta y_{12}} \qquad (5)$$

$$\left(\Delta y_{01} \frac{\Delta x_{12}}{\Delta y_{12}}\right)^2 + \Delta y_{01}^2 = a^2 \cos^2(\alpha) \qquad (6a)$$

$$\Delta y_{01}^2 \left(\frac{\Delta x_{12}^2}{\Delta y_{12}^2} + 1\right) = a^2 \cos^2(\alpha) \qquad (6b)$$

$$\Delta y_{01} = \frac{a\cos(\alpha)}{\sqrt{\left(\frac{\Delta x_{12}^2}{\Delta y_{12}^2} + 1\right)}} \qquad (7a)$$

$$\Delta x_{01} = \frac{\Delta x_{12}}{\Delta y_{12}} \frac{a\cos(\alpha)}{\sqrt{\left(\frac{\Delta x_{12}^2}{\Delta y_{12}^2} + 1\right)}} \qquad (7b)$$

FIG. 1E

GENERATING SIGNALS REPRESENTATIVE OF SENSED LIGHT THAT IS ASSOCIATED WITH WRITING BEING DONE BY A USER

BACKGROUND

This disclosure relates to efficiently focusing light.

By tracking the motion of a pen, for example, as it is used to write or draw on paper, it is possible to capture and reproduce electronically what is being written or drawn. Motion of a stylus that does not leave a mark on a writing surface can also be tracked. Systems for accomplishing this were described in U.S. Patent application Ser. No. 10/623,284 (Now U.S. Pat. no. 7,268,774), filed Jul. 17, 2003, which is incorporated here by reference.

In some proposed approaches, the surface on which the pen is moving may have an array of pixels or other sensing locations, such as touch sensors, each of which responds when the pen is at such a location. In other techniques triangulation algorithms are used to track the motion.

As described in the above-referenced application, the pen may emit light that is detected by sensors mounted on the writing surface, and its position may be determined based on the readings of those sensors.

SUMMARY

In general, in one aspect, an array of sensitive pixel elements is configured to generate signals representative of sensed light that is associated with writing being done by a user, and an optical system concentrates light from a light source across a section of the array of sensitive pixel elements, the signals being useful to compute a subpixel measurement of a position of the light source.

Implementations may include one or more of the following features. The array includes a row of pixels along a length of the array. The sensitive pixel elements are sensitive to infrared light. The array of sensitive pixel elements includes a lateral position measurement detector. The lateral position measurement detector is a CMOS linear array The lateral position measurement detector is a CMOS 2D array The lateral position measurement detector is a CCD linear array The lateral position measurement detector is a CCD 2D array The lateral position measurement detector is a position sensing detector (PSD). The light includes infrared light. The optical system includes a lens. The lens includes a single spherical lens. The lens has a cross-section that is constant along a length of the lens. The lens includes a single cylindrical lens. The lens includes a single aspheric lens. The optical system is configured to concentrate the light into an elongated shape on the array. The shape is a line. Concentrating includes focusing the light onto the array. The optical system includes an opening in an optically opaque material. The optical system includes a combination of a transparent refractive lens and an opening in an optically opaque material. The optical system includes a series of two or more lenses The optical system includes a pinhole aperture The optical system includes a slit aperture The optical system includes a single Fresnel lens The optical system includes a series of two or more Fresnel lenses The optical system includes a single binary lens The optical system includes a series of two or more binary lenses The optical system includes a reflective surface positioned to reflect light from the light source onto a lens. The optical system includes a material to transmit infrared light and not transmit other light. The computed position of the light source is a vertical projection of a position of the light source onto a plane defined by the writing surface.

A second array of sensitive pixel elements is configured to generate signals representative of the sensed light, and a second lens concentrates light from the light source across a section of the second array of sensitive pixel elements, the signals from the first and second arrays being useful to compute a subpixel measurement in two dimensions of the position of the light source. The first and second lens each include an opening in an optically opaque material. The first and second lens each include a combination of a transparent refractive lens and an opening in an optically opaque material. The first array and first lens together include a first sensor, and the second array and second lens together include a second sensor, in which the first and second sensors are each rotated such that the first and second arrays are not in a common plane. The first and second sensors are positioned such that the sensors can detect the light source as it is moved over a writing surface. The writing surface includes an area corresponding to a standard size of paper. The writing surface includes a white board. The writing surface includes a drawing pad. The first and second sensors are located about 120 mm apart and are each rotated about twelve degrees towards each other, as measured from parallel lines through the two sensors. The first and second sensors are located at adjacent corners of a writing surface, and each rotated forty-five degrees relative to an adjacent edge of the writing surface. A third and forth sensor are located at four corners of a writing surface and are each rotated forty-five degrees relative to an adjacent edge of the writing surface. A third and forth sensor are located along four sides of a writing surface. A structure is configured to hold the arrays and lenses in positions where they can detect the position of the light source as it is moved over a writing surface. The structure includes a pen holder. The structure includes a pen cap. The light source is associated with a writing instrument, and the pen holder is configured to accommodate the writing instrument. The pen holder is configured to be attached to an edge of the writing surface. The structure includes a body of a computer, and the writing surface includes a screen of the computer.

In general, in one aspect, an array of sensitive pixel elements is configured to generate signals representative of sensed light that is associated with writing being done by a user, the array being characterized by a plane defined by the sensitive pixel elements, an axis through the sensitive pixel elements, and a center point between equal sets of the sensitive pixel elements, and a lens concentrates light from a light source onto the array of sensitive pixel elements, the lens being characterized by an axis through its center and positioned with its axis offset from the center point of the array, the signals being useful to compute a subpixel measurement of a position of the light source. Implementations may include the lens being characterized by a curved surface and a flat surface, and positioned such that the flat surface is not parallel to the plane of the array.

In general, in one aspect, an array of sensitive pixel elements is configured to generate signals representative of sensed light that is associated with writing being done by a user, the array being characterized by a plane defined by the sensitive pixel elements, an axis through the sensitive pixel elements, and a center point between equal sets of the sensitive pixel elements, and a lens concentrates light from a light source onto the array of sensitive pixel elements, the lens having a curved surface and a flat surface, and positioned such that the flat surface is not parallel to the plane of the array, the signals being useful to compute a subpixel measurement of a position of the light source.

Implementations may include one or more of the following features. The lens is cylindrical. An axis through the cylindrical shape of the lens is in a plane perpendicular to the axis of the sensitive pixel elements. An opening in an optically opaque material controls an amount of light reaching the lens. A second array of sensitive pixel elements is configured to generate signals representative of the sensed light, the second array being characterized by a plane defined by the sensitive pixel elements, an axis through the sensitive pixel elements, and a center point between equal sets of the sensitive pixel elements, and a second lens concentrates light from the light source onto the second array of sensitive pixel elements, the second lens having a curved surface and a flat surface, and positioned such that the flat surface is not parallel to the plane of the second array, the signals from the first and second arrays being useful to compute a subpixel measurement in two dimensions of the position of the light source.

In general, in one aspect, near a writing surface, an array of sensitive pixel elements is configured to generate signals representative of sensed light that is associated with writing being done by a user, a lens concentrates light from a light source in a shape other than a spot onto the array of sensitive pixel elements, and a reflective surface is positioned to reflect light from the light source onto the lens, when the light source is near the writing surface, the signals being useful to compute a subpixel measurement of a position of the light source. An optically opaque barrier may be positioned between the writing surface and the reflective surface, a portion of the barrier defining an opening positioned to admit light from the light source when the light source is near the writing surface.

In general, in one aspect, two optical sensors separated by a lateral distance are used to generate a set of signals representing subpixel values and usable to reconstruct a position of a light source that is associated with a writing instrument being used by a user, and the signals are used to compute a measurement of a position in two dimensions of the light source near a writing surface, in which using the optical sensors includes using an optical system to concentrate light from the light source in a shape other than a spot onto an array of sensitive pixel elements.

Implementations may include one or more of the following features. Computing the measurement includes using a quasi-triangulation algorithm. Computing the measurement includes using calibrated parameters. Computing the measurement includes using a lookup table. Computing the measurement includes using a polynomial approximation. The two optical sensors are used to generate a second set of signals representing subpixel values and usable to reconstruct a position of a second light source that is associated with a second position along a length of the writing instrument, and the first and second sets of signals are used to compute a measurement of an angle between the writing instrument and the writing surface. The first and second sets of signals are used to compute a position in two dimensions of a tip of the writing instrument on the writing surface.

In general, in one aspect, a device holds paper in a location, and at least two sensor assemblies are located near the location to generate signals representative of sensed light that is associated with writing being done on the paper. The sensor assemblies each include an array of sensitive pixel elements and a lens to concentrate light from a light source in a shape other than a spot onto the array of sensitive pixel elements.

In general, in one aspect, in or near a housing for a computer display, at least two sensor assemblies generate signals representative of sensed light that is associated with writing being done on the display. The sensor assemblies each include an aperture in the housing, an array of sensitive pixel elements, a lens to concentrate light from a light source in a shape other than a spot onto the array of sensitive pixel elements, and a reflective surface to direct light entering through the aperture onto the lens.

Implementations may include one or more of the following features. The computer display is a monitor of a tablet computer. The computer display is a monitor of a laptop computer. The computer display is a screen of a portable communications device.

Advantages include an improved vertical field of view to detect light reaching the sensors at an angle. Two light sources can be detected, allowing computation of the angle between the pen and the writing surface. The sensors can be positioned above or below the level of the writing surface, and at a variety of angles relative to the writing surface. Sensors can be positioned to sense writing over the entirety of a writing surface. The position of the pen can be determined with subpixel accuracy. A single lens can be used with each sensor to produce accurate measurements. Calibration can be performed during manufacturing. The sensors and/or lenses can be independently positioned to adjust the field of view and reduce blind spots.

Other features and advantages will become apparent from the description and from the claims.

DESCRIPTION

FIG. 1E is a series of formulas.

The above-referenced application describes an electronic wireless pen that emits light that is collected by external sensors to measure the pen's position with respect to the sensors. The pen may also be equipped with traditional writing components to leave a visible mark as it is drawn across a page. The sensors are CMOS or CCD linear or 2D arrays, Position Sensitive Detectors (PSD), or other light sensitive detectors. The sensors can be clipped to the edge of writing surface allowing reconstruction of writing on that surface. The position of the pen is determined by mapping the sensor readings to the actual XY position of the pen on paper. In some examples, infrared (IR) light is used and the sensors are configured to detect IR light. Other light sources, including ultraviolet and visible light, may be used.

The electronic input device looks like a regular pen with a holder that contains the sensors. The user writes with it just as with any ordinary pen on paper, notebook or other flat surface. The input device is used to capture handwriting text or drawings. The pen's movements are detected by the sensors and communicated to the processor of the input device, which stores all of the pen's movements during its use by recording the sensor measurements into its memory. The input device then downloads its movements to a computer, personal digital assistant, handheld computer, cellular phone, or other device. The handwriting, as it appears on a page, is then automatically reconstructed from sensor information. In some examples, the sensors' readings may be recorded by a processor positioned in the pen itself rather than directly connected to the sensors. In some examples, the handwriting is reconstructed on the pen or pen cap/holder directly.

Figure 1A:
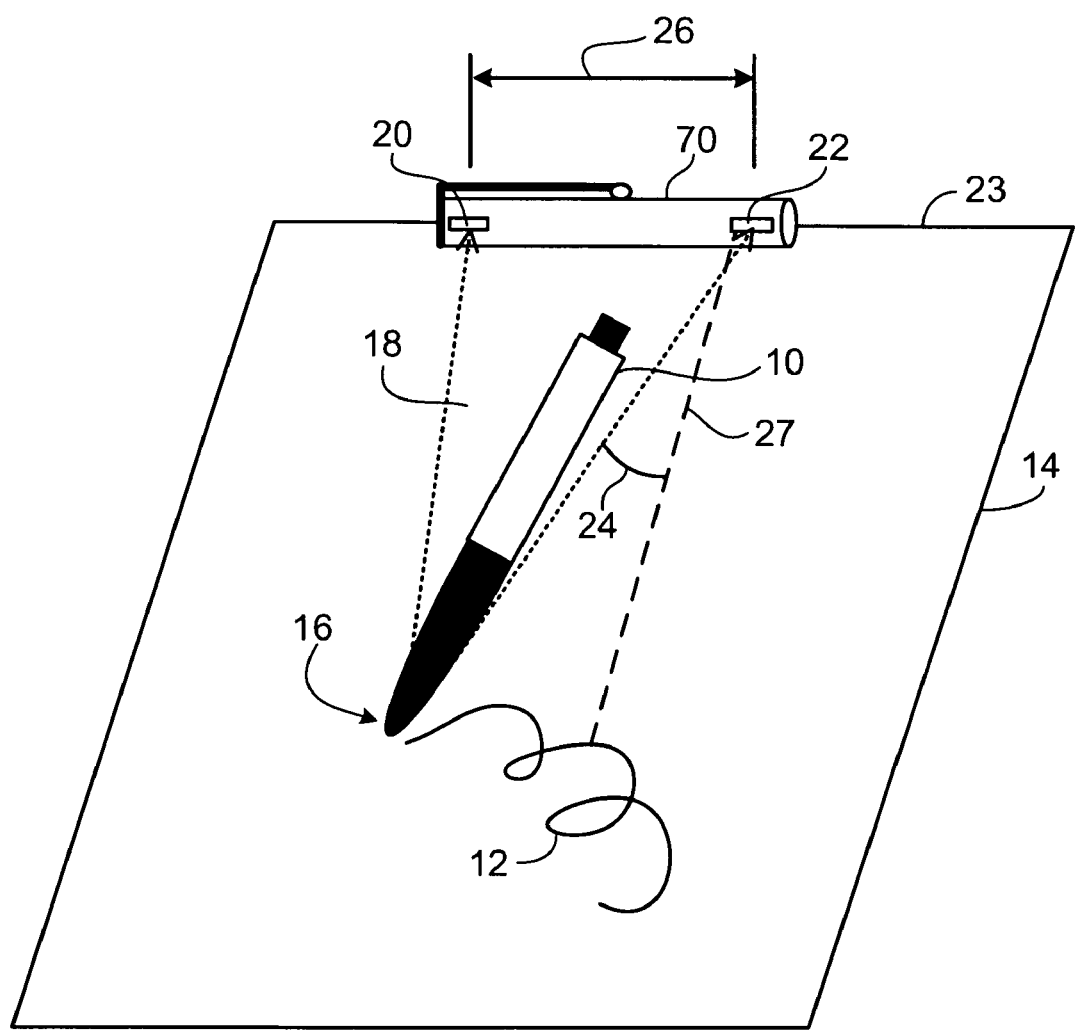
FIG. 1A is a perspective view of a writing instrument and sensor assembly in use.

As shown in FIG. 1A, a pen or other writing instrument 10 that leaves a visible trace 12 of writing or drawing in the usual way on a sheet of paper or other writing surface 14 may also have a source 16 that emits infrared (IR) light 18 for use in automatically tracking the motion of the pen. The light is detected by IR sensors 20, 22 that are mounted in a pen cap 70 and held stationary relative to the pen at a nearby location, for example, near the edge 23 of the paper.

The sensors 20, 22 capture and deliver sequences of signals that can be interpreted by a processor (not shown) to represent the position (e.g., angle 24 between a line connecting the light source 16 and a normal vector 27 from the center of the sensor 22) of the pen on the writing surface 14 at which the light is received from the pen for each of a succession of measurement times. To calculate the actual position of the pen 10 on the writing surface 14, two angles, one from each sensor 20, 22, can be used in a triangulation calculation. Circuitry associated with the processor uses an algorithm to process the signals from the sensors 20, 22 (and the known distance 26 between the sensors) to determine a succession of positions of the pen 10 as it is moved across the writing surface 14. The algorithm can use a mathematical model that translates pixel signals of the sensors 20, 22 into positions on the writing surface 14. The algorithm could be, for example, a quasi-triangulation algorithm using calibrated parameters (e.g., distance from lens to sensor, horizontal offset between them, and others) or it could be a polynomial approximation or a lookup table, or any combination of such techniques.

In some examples, the sensors are fixed in the writing surface, for example, in a tablet PC using optical sensors rather than a digitizing surface. More than two sensors may be used, for example, four sensors, one near each corner. This may be advantageous in applications where the writing surface is large enough that there is a risk of the user inadvertently placing a hand or other object between the pen and one of the sensors. The particular configuration of writing surface and sensor position in a given application dictates, to at least some extent, the necessary field of view of each sensor. This in turn can be used to determine the design of the sensor, including the relationship between any lenses used and the optically sensitive elements of the sensor.

Figure 2:
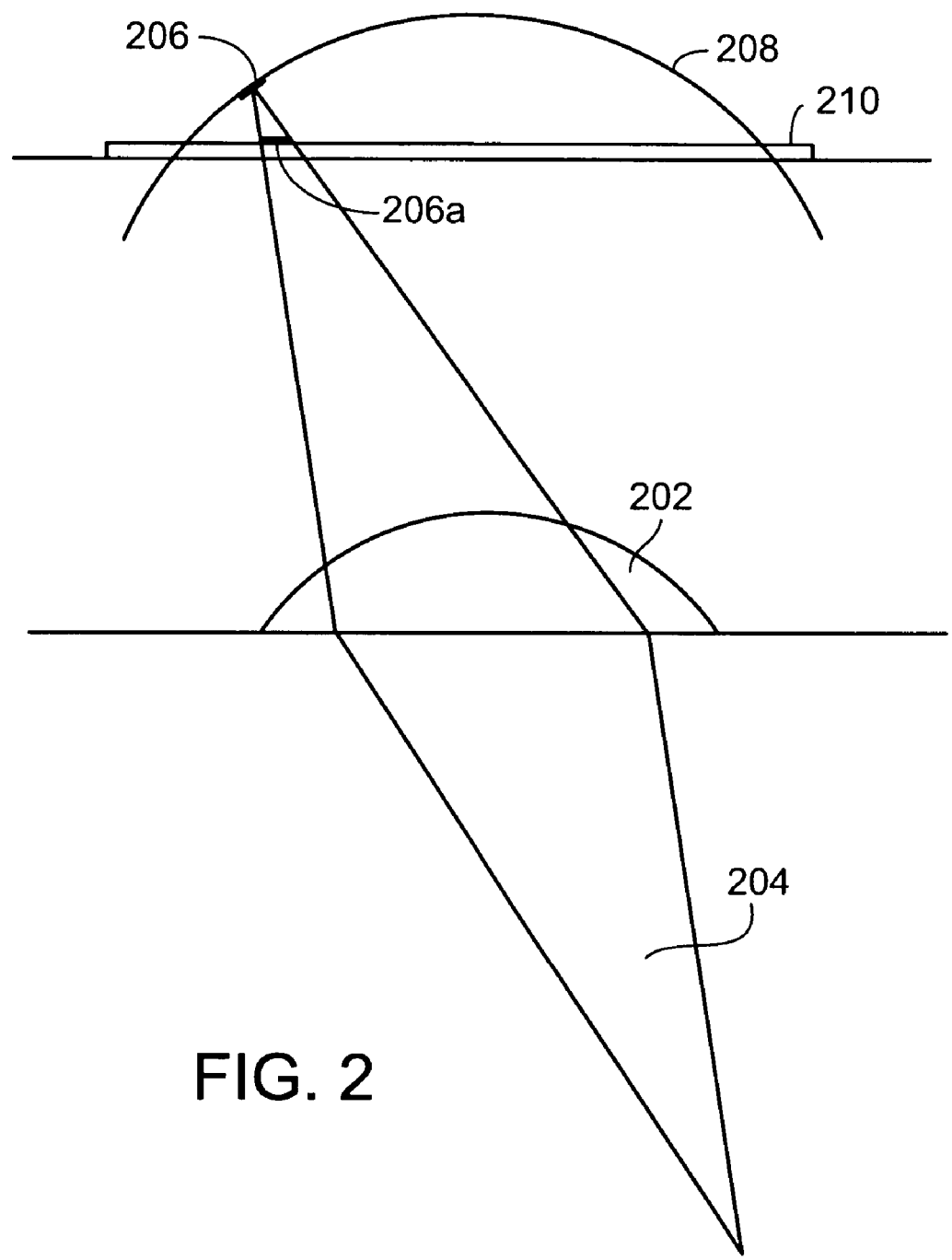
FIGS. 2 and 12A are schematic plan views of light passing through a sensor-lens assembly.

When linear sensor arrays are used to detect the position of the light source, it is useful to control the way in which the light is focused on the sensor arrays. In some examples, a spherical half-ball lens is used. As shown in FIG. 2, a spherical lens 202 focuses a ray of incident light 204 (illustrated as a slightly divergent beam) into a spot 206 on an imaginary focal plane 208 (which is actually a sphere). The position at which a sensor array 210 intercepts the refracted light is used to calculate the angle of the incident light, at the lens, in the horizontal plane of the paper. Since the refracted light actually forms a cone, tapering to a point on the focal plane, the light forms a slightly altered spot 206a at the point it intersects the linear sensor array 210. If this spot 206a is larger than the height of the sensor array, or not vertically centered on it, some of the light energy in the refracted light may miss the light-sensitive elements of the sensor array 210. In some examples, positioning the sensor array 210 and lens 202 assembly such that the vertical center of the sensor array 210 is at the same height above the writing surface 14 as the light-emitting portion 16 of the pen 10 helps assure that the spot 206a is vertically centered on the sensor array 210. This positioning also decreases errors resulting from the tilt of the pen 10, which can cause the incident light 204 to reach the lens 202 at an angle relative to the writing surface 14, in which case the spot 206a is shifted vertically. Algorithms can be used to calculate the position of the center of the spot 206a from whatever light is captured. In some examples, a combination of a spherical lens with a horizontally-aligned sensor array had a vertical field of view as low as 1.5° around a horizontal line through the center of the lens 202. This requires precise positioning of the lens relative to both the sensor array and to the writing surface. An off-the-shelf sensor, 8 mm long with 1024 pixels each measuring 125 µm high by 7 µm wide, was used in some examples. Combined with a spherical lens with a refraction coefficient of 1.5, it was found that a 2 mm lens positioned with its outer, flat surface 4-5 m away from the sensor produced good results. Due to the limited vertical field of view, positioning the spherical lens to assure that spot 206a is on the sensitive elements of the sensor array 210 requires that the lens be centered over the sensor within manufacturing tolerances as fine as 0.025 mm.

Figure 3:
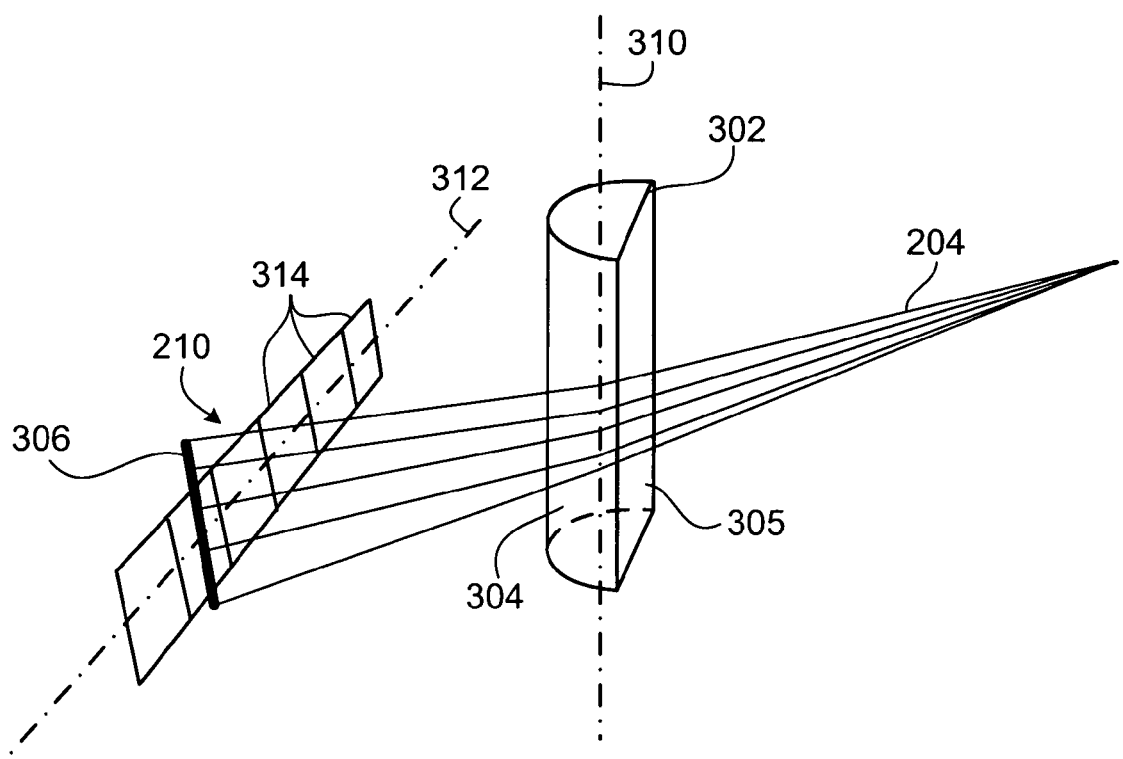
FIG. 3 is a schematic perspective view of light passing through a sensor-lens assembly.

In an example shown in FIG. 3, a cylindrical lens 302 is positioned with its curved side facing the linear sensor array 210. The axis 310 of the cylinder of the lens 302 is perpendicular to the plane of the writing surface 14, while the horizontal axis 312 through the elements 314 of the linear sensor array 210 is parallel to the writing surface 14. The plane of the light-sensitive elements 314 is perpendicular to that the plane of the writing surface 14 or can be slightly tilted towards it. Cylindrical lens 302 is a section of a cylinder having a curved face 304 and a flat face 305. The cylindrical lens 302 focuses the incident light 204 into a vertical line or elongated spot 306 rather than a circular spot as with a spherical lens. Because of the orientation of the cylindrical lens 302 relative to the sensor array 210, the vertical line 306 covers the full height of the sensor array 210, assuring that a substantial amount of the line of light 306 reaches and effectively illuminates the light-sensitive elements 314. Replacing a spherical lens with a cylindrical lens provides a vertical field of view of as much as 45° and allows the sensor assembly to be built with more flexible manufacturing tolerances. It also allows the sensors to detect the position of the light source 16 when it is farther away from the writing surface 14 than can be detected with a cylindrical lens. This may make the calculation of the position of the writing instrument 10 more complex, but allows additional features, for example, changing modes when the writing instrument 10 is lifted from the writing surface 14. The cylindrical lens 302 does not enlarge the vertical dimension of the incident light 204, and does not interfere with the ongoing divergence of the light in the vertical dimension. Rather, it focuses the horizontal spread of the incident light into a narrow range in the horizontal dimension, resulting in the line 306 that covers at least a single pixel but preferably more than one pixel, to efficiently run algorithms for finding the center of energy of the light spot with a sub-pixel resolution, that is, a resolution higher than the physical resolution of the sensor array 210. Viewed from above, FIG. 3 would appear the same as FIG. 2. One trade-off in using such a lens is a decreased overall brightness of the projected line 306, as compared to the bright spot of a spherical lens, if such a spot could be accurately focused on the pixel elements 314.

Figure 1B:
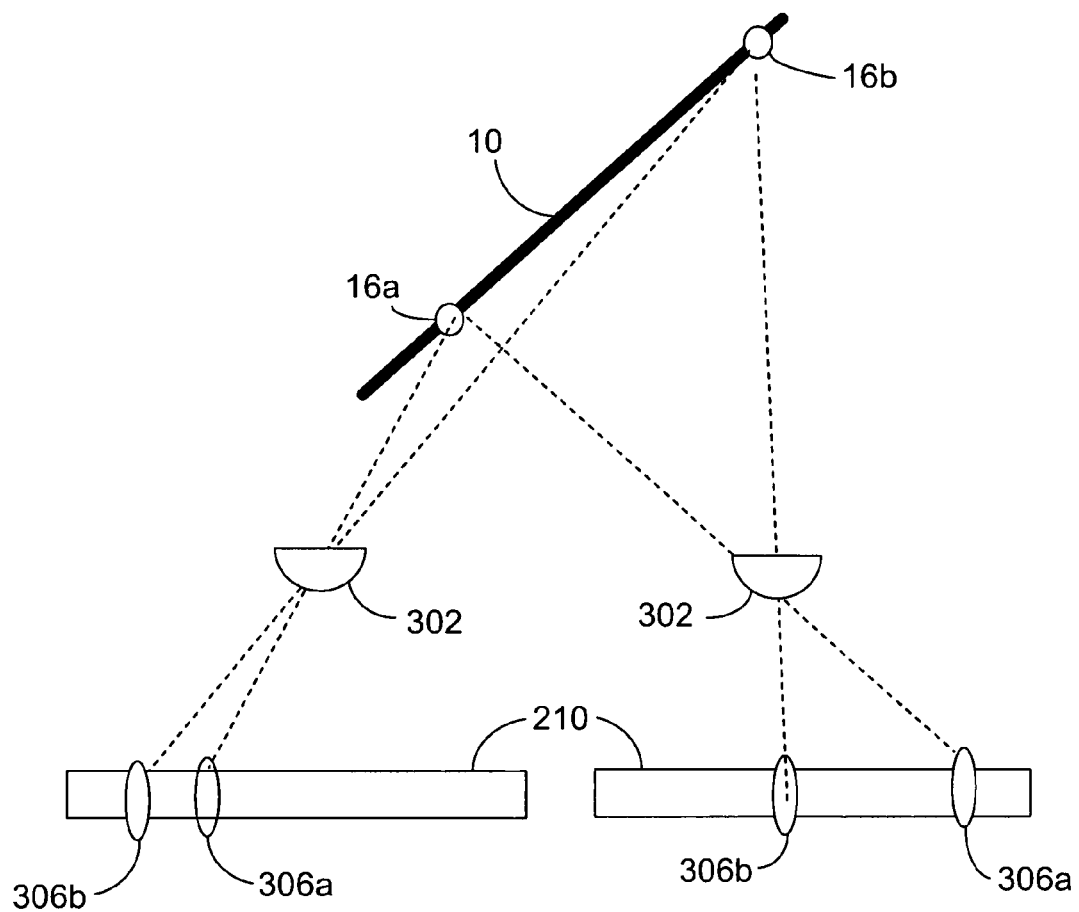
FIG. 1B is a schematic view of a writing instrument and sensor assembly.
Figure 1C:
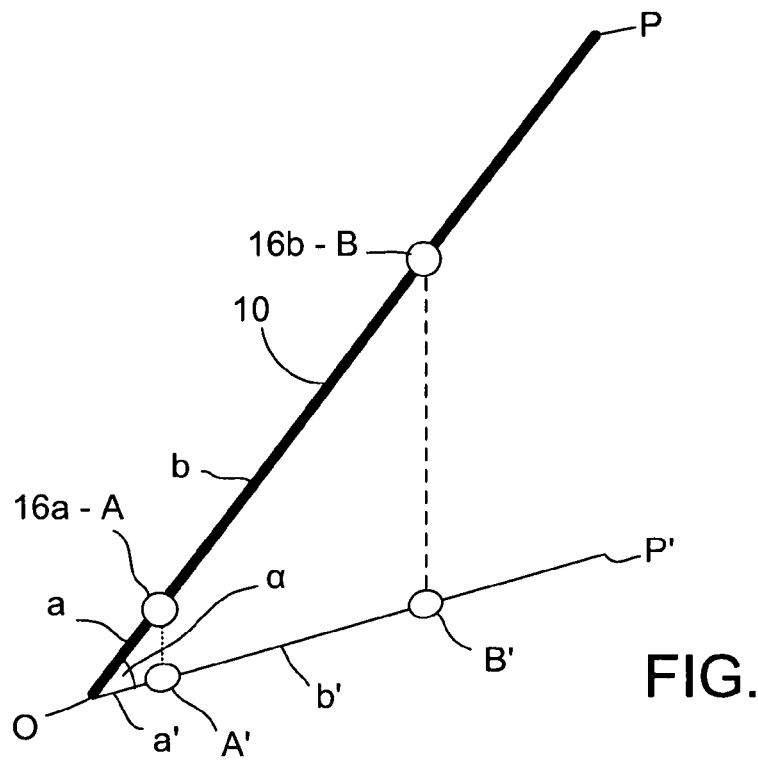
FIG. 1C is a schematic perspective view of a writing instrument.
Figure 1D:
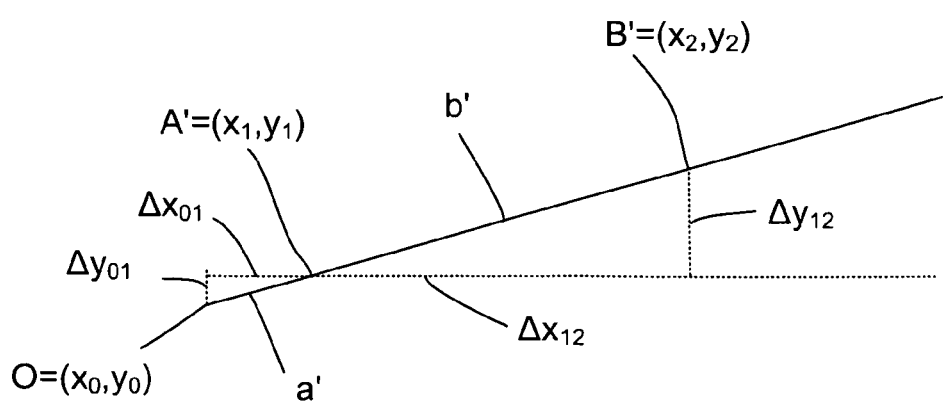
FIG. 1D is a geometric diagram representing a calculation of a writing instrument's position.

The enlarged vertical field of view of a cylindrical lens also allows the use of two or more light sources, located at different positions along the length of the writing instrument, as shown in FIG. 1B. Two light sources 16a and 16b on the pen 10 project two lines 306a, 306b onto each of the sensor arrays 210. This allows calculation of the angle of the pen 10, which can be used to generate a more precise calculation of the position of its tip. The calculation can be performed using standard trigonometric calculations as shown in FIGS. 1C-1E. The two light sources 16a and 16b form line segments OA and OB, which project onto the writing surfaces as segments OA' and OB'. The first light source 16a is located a known distance a from the tip of the pen 10, and the second light source 16b is located an additional known distance b from the first light source. Segments OA' and A'B' have corresponding lengths a' and b'. The pen 10 forms an angle α with the writing surface. As shown in FIG. 1D, points A' and B' have x,y, coordinates $(x_1,y_1)$ and $(x_2,y_2)$, respectively, on the writing surface, as determined by processing measurements from the sensors 210 and using calibration parameters and/or lookup tables or other reconstruction techniques. The distances $\Delta x_{12}$, etc., between these points, together with the known distances a and b can be used to calculate the angle α and the coordinates $(x_0,y_0)$ of the pen tip (point O) using the equations in FIG. 1E.

The distance a' from the tip of the pen to the point A' is given by Eq. (1). Cos(α) is found from the ratio of sides OB and OB' (Eq. (2)). Length b' is found from the measured locations of points A' and B', from which $\cos^2(\alpha)$ is found in terms of known values (Eq. (3)). Beginning with Eq. (4), the distances $\Delta x_{01}$, $\Delta y_{01}$ can be found based on the similarity of the triangles formed by the projected line segments and their corresponding coordinate components. That is, the ratio between distances $\Delta x_{01}$ and $\Delta x_{12}$ is the same as the ratio between $\Delta y_{01}$ and $\Delta y_{12}$, giving the relationship in Eq. (5). Substituting that back into Eq. (4), as in Eqs. (6a) and (6b), $\Delta y_{01}$ is found (Eq. (7a)). Again using Eq. (5), $\Delta x_{01}$ is likewise found in terms of known quantities (Eq. (7b)).

Tilt information may also be used for additional features, for example, allowing a user to vary the thickness of a line by varying the tilt of the pen. To differentiate the two light sources, they could be configured to illuminate in an alternating pattern, with the processor synchronized to identify which is which. Other methods of differentiating the light sources could also be used, such as illuminating at different frequencies or flashing at different rates. The ability of two light sources to allow calculation of the tip position and angle may also allow the light sources to be separate from the pen itself, for example, in an attachment that can be used with any pen provided by a user.

Figure 4A:
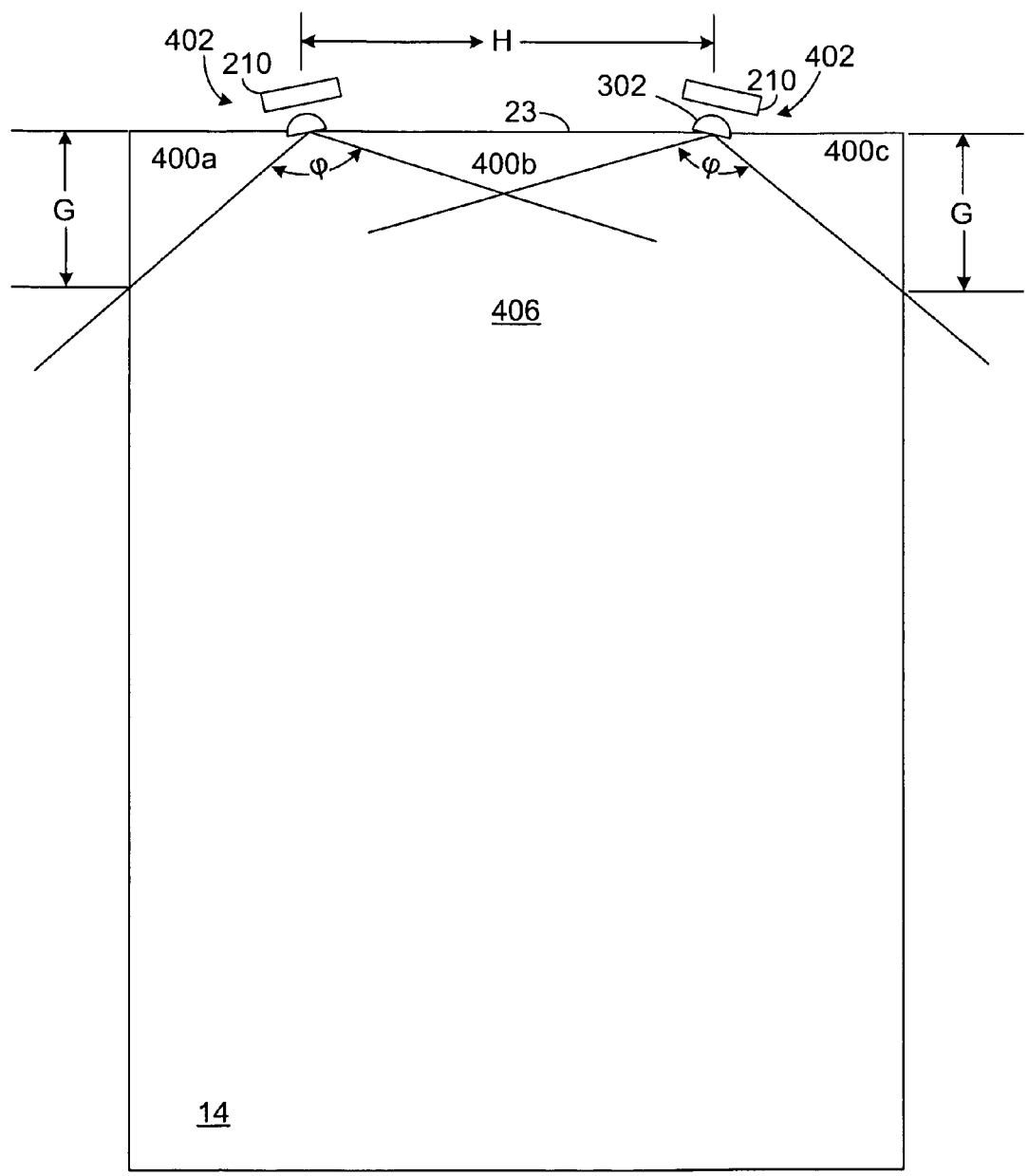
FIGS. 4A-4C are schematic plan views of sensor-lens assemblies and writing surfaces.

In a system with two sensors, a "dead zone" exists outside the two sensors' respective fields of view, for example, regions 400a, b, and c in FIG. 4A. To reduce this, the combinations 402 of sensor 210 and lens 302 are rotated slightly toward the space between the sensors. Rotating the sensor-lens combinations 402 towards the center of the page allows their fields of view to overlap to cover the page most efficiently and minimize the dead zones and optimize page coverage. This will allow also more efficient illumination of lens 302 and consequently stronger signals than if the sensors 210 were aligned with the edge 23 of the writing surface 14. This also produces an enlarged total field of view 406. The dead zone is also affected by the tilt of the pen—if the pen is close to the sensor and tilted to too great an angle, depending on the design of the light source, the light may miss the sensor assembly completely. This may be addressed by positioning the sensor farther, vertically, from the writing surface, or changing the tilt of the sensor towards or away from the writing surface. The larger vertical field of view of a cylindrical lens also helps address this problem.

Figure 5:
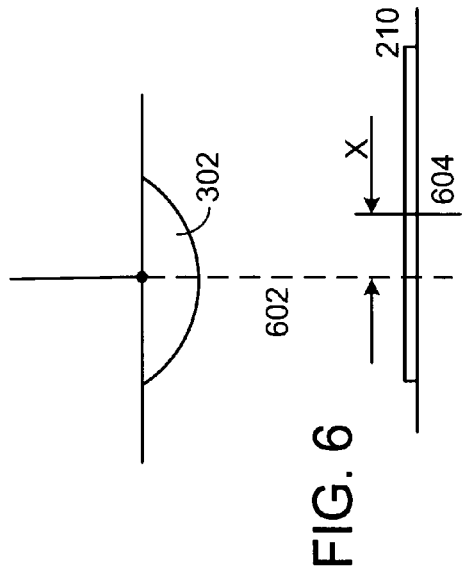
FIGS. 5-7 are a schematic plan views of sensor-lens assemblies.
Figure 6:
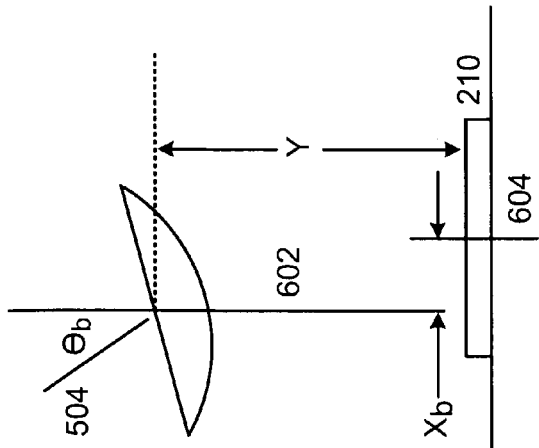
Figure 7:
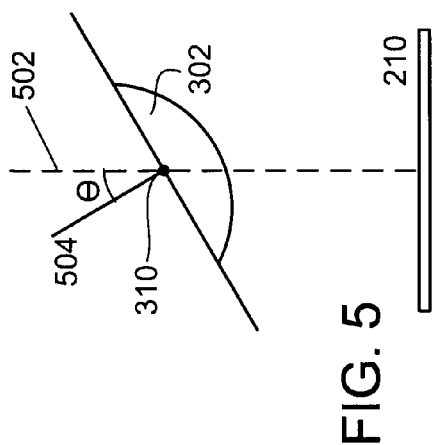
Figure 7:
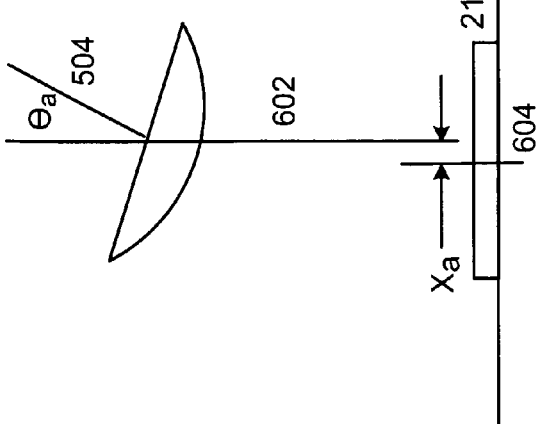

In some examples, a single printed circuit board is used for all of the electronics including the sensors. As shown in FIG. 5, rather than rotating the entire sensor-lens assembly 402, the lens 302 may be rotated some amount θ about its own axis 310 (measured by the original (502) and new (504) position of a normal to the flat plane of the lens 302), with the sensors 210 remaining parallel to the edge 23 of the writing surface 14 (see FIG. 1). Instead of or in addition to rotating the lenses, the center of the lens 302 (shown by line 602) may be offset some distance X from the horizontal center 604 of the sensor array 210, as shown in FIG. 6. Such variations can be used to effectively decrease the blind spot 400b or to enlarge the field of view 406 of the sensors 210 to assure that they can detect pen positions over a larger writing area. As shown in FIG. 7, a pair of sensor-lens assemblies 402 may have their lenses 302 rotated and/or shifted by different amounts θa, θb or Xa, Xb, or in different directions, for example to allow the sensors 210 to be offset from the center of the writing surface 14.

Returning to FIG. 4A, in some examples, it has been found that for a two-sensor system, lenses 302 located a distance of 4 mm away from the corresponding sensor arrays 210 (dimension Y in FIG. 7, as measured from the axis 310 of the cylinder of the lens 302 and the sensing surface of the sensor array 210), with the sensor-lens assemblies 402 each rotated 12° towards the center of the writing surface and separated by 120 mm, produce a good field of view 406 covering 87% of an 8.5×11 inch writing surface 14 with minimal blind spots 400a-c (extending a distance G of around 37.5 mm from the edge 23). The sensor-lens assemblies 402 in this example each have a field of view φ of 131°. A separation distance H of only 120 mm allows the sensor-lens assemblies 402 to be conveniently located, for example, in a container for the pen, including a pen cap. It is expected that leaving the sensors 210 parallel while shifting and rotating the lenses 310 will produce the same results.

Figure 4B:
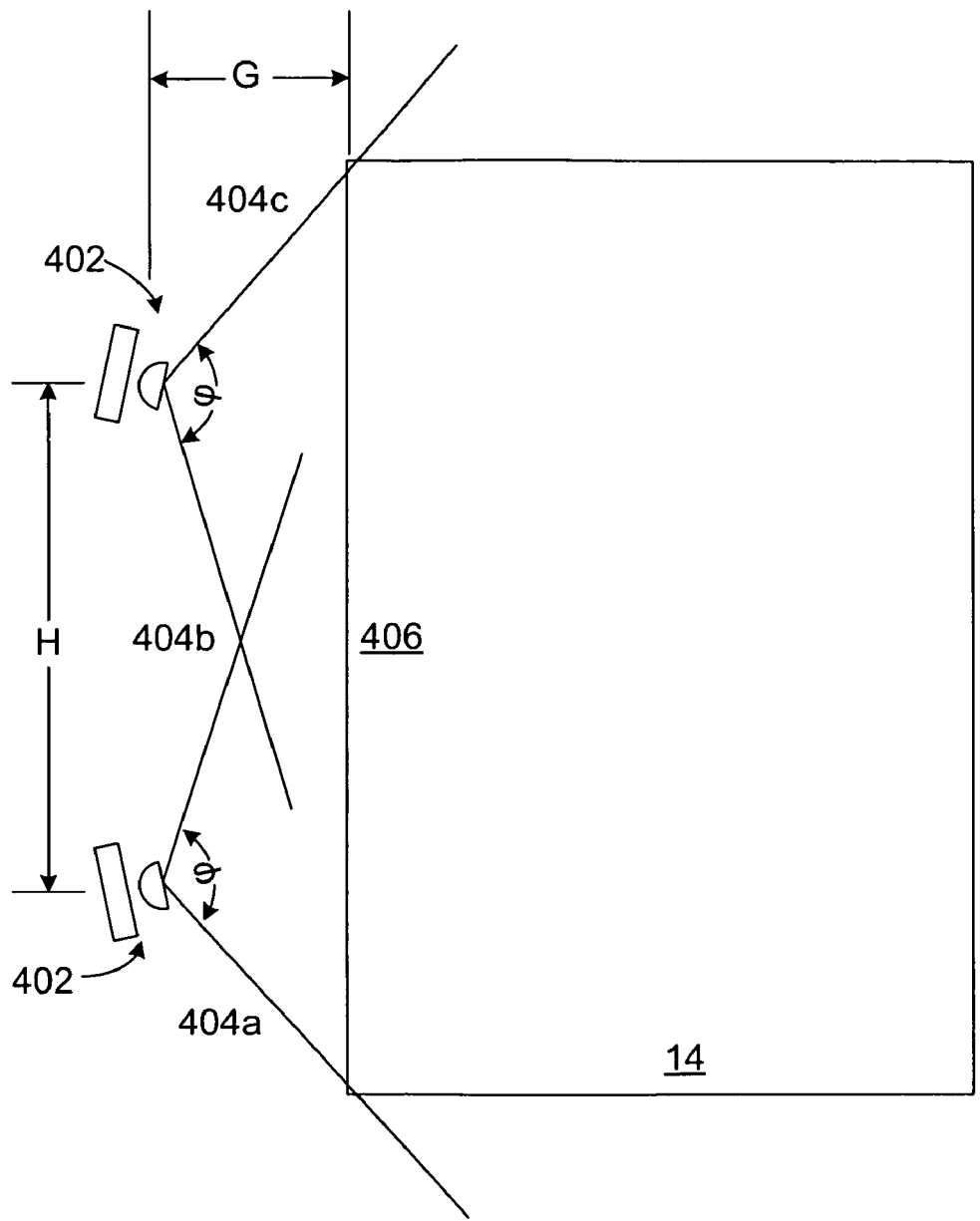
Figure 4C:
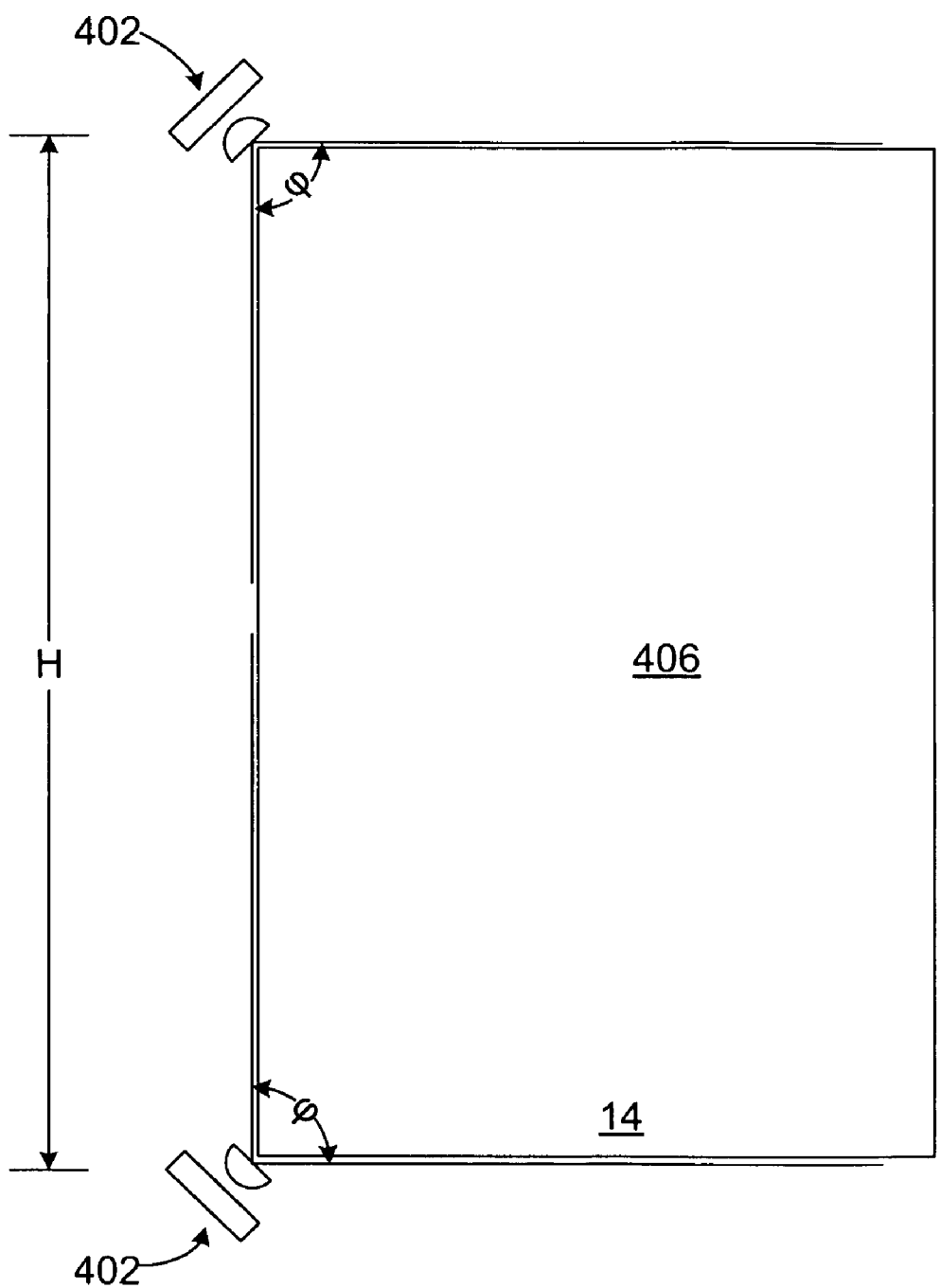

Moving the sensors to the side of the writing surface, as shown in FIG. 4B, increases the blind spots 404a and 404c to a distance G of 50 mm, since the top and bottom edges of the writing surface 14 are farther from the sensor assemblies 402, but if the sensors are located at least the same distance from the edge of the writing surface, they can cover 100% of an 8.5×11 inch sheet 14. In another example, as shown in FIG. 4C, sensors-lens assemblies 402 having only a 90° field of view φ are located at two corners on one side of the writing surface 14, a distance H of 300 mm apart. With each assembly 402 rotated 45° relative to the side of the writing surface 14, they cover 100% of an 8.5×11 inch sheet with no blind spot.

Figure 4D:
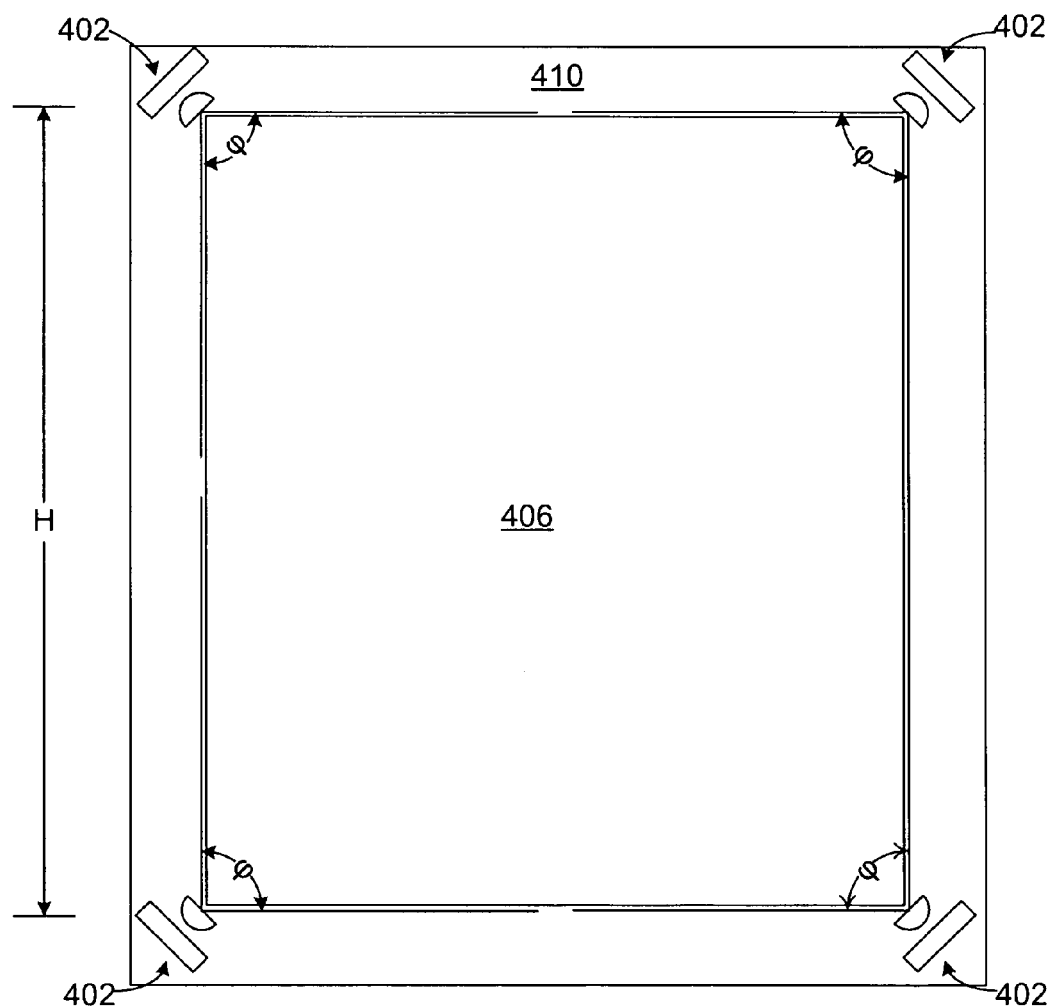
FIG. 4D is a schematic plan view of sensor-lens assemblies and a device screen.

In another example, as shown in FIG. 4D, sensor-lens assemblies 402 with a 90° field of view, located at all four corners of a 15 inch tablet PC monitor 410, and rotated 45° relative to the edge of the screen, cover 100% of the screen with no blind spot. This may allow, for example, an optical system to be used to detect stylus input on the tablet PC rather than a digitizer or touch-screen hardware.

Figure 4E:
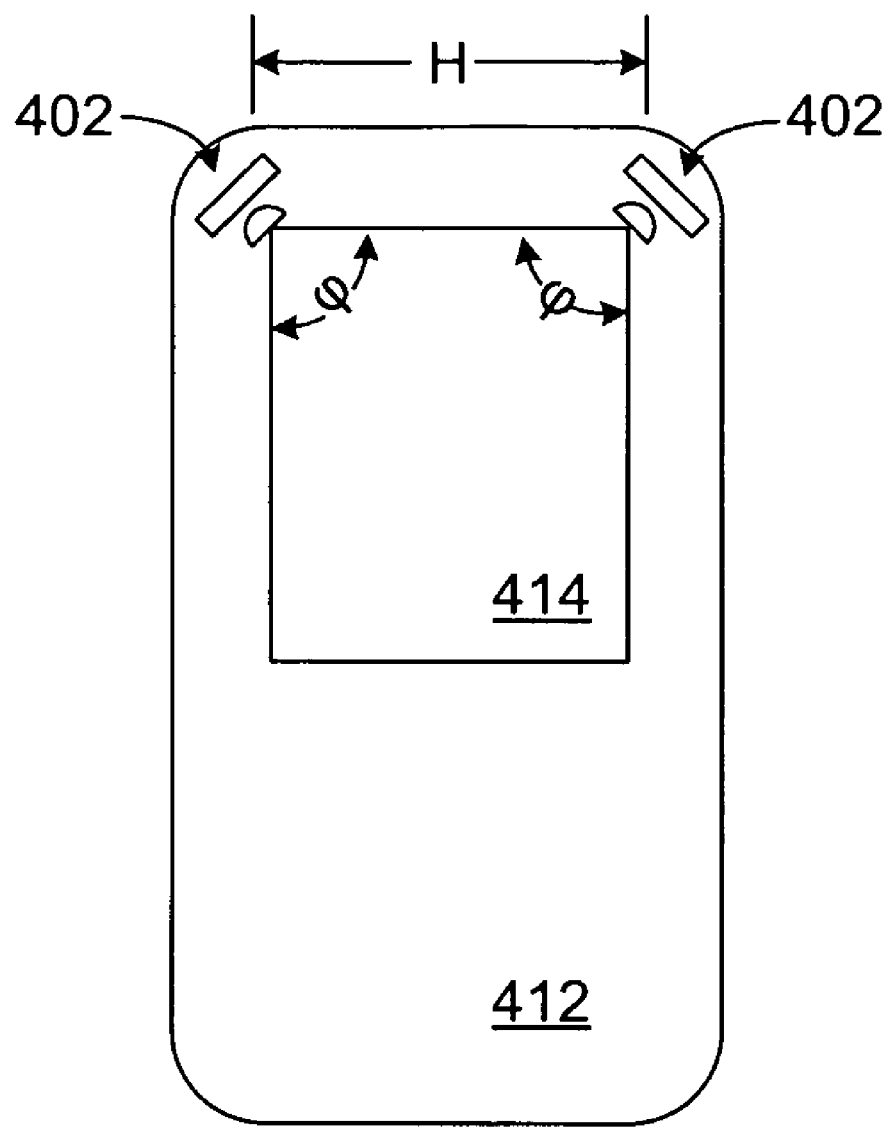
FIG. 4E is a schematic plan view of sensor-lens assemblies and a portable device with a display screen.

In another example, as shown in FIG. 4E, a cellular telephone 412 has a screen 414 measuring 40 mm×50 mm. Sensor-lens assemblies 402 with a 90° field of view φ can be located at two corners of the screen 414, separated by a distance H of 40 mm and rotated 45°, and cover 100% of the screen 414 with no blind spot.

Figure 8B:
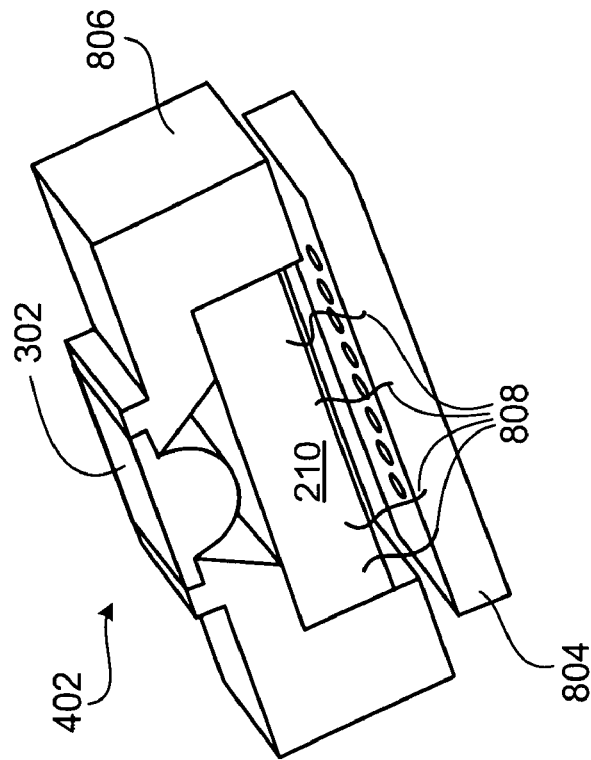
FIGS. 8A-8B are perspective sectional views of sensor-lens assemblies.
Figure 8A:
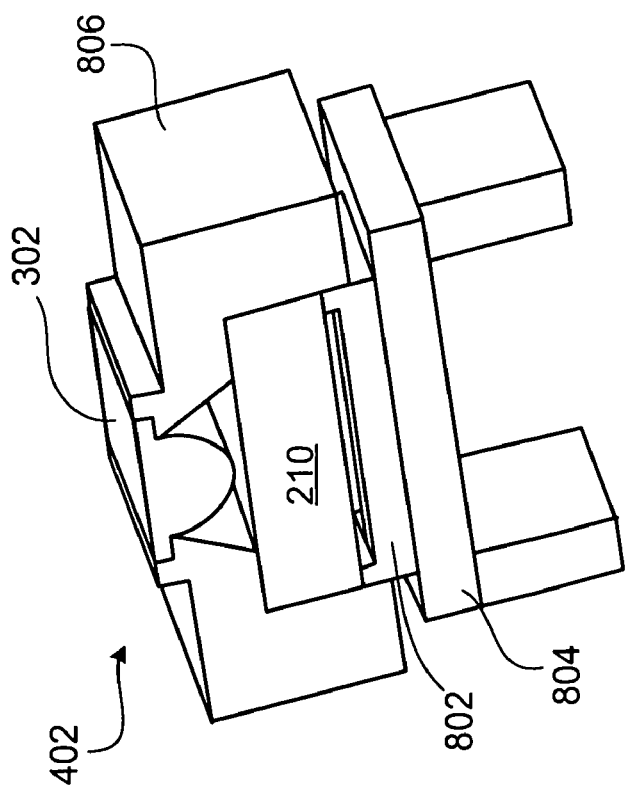

Two example sensor-lens assemblies 402 are shown in FIGS. 8A and 8B. In each case, the lens 302 is positioned near a sensor array 210. The linear sensor arrays 210 are typically discreet electronic components that may be soldered or wire-bonded to a printed circuit board or to a daughter board, or they may be free-standing devices connected to other elements by wires. In the example of FIG. 8A, the sensor array 210 is seated in a socket 802, which is in turn soldered to a circuit board 804. The lens 302 is held in the proper position by a frame 806. In the example of FIG. 8B, the socket 802 is absent and the sensor array 210 is held in place by the same frame 806 that holds the lens 302 and connected to the circuit board 804 by wires 808. The frame 806 could be attached to the circuit board 804 or could be attached to some other part, such as a housing for the entire sensor assembly (not shown). In examples using a spherical lens 202 (as in FIG. 2), it has been found that mounting the frame 806, including the lens 202, to the body of the device, rather than to a circuit board or other component part to be installed into the device, is necessary for the lens 202 to be positioned parallel to the edge of the writing surface with sufficient accuracy to assure that the field of view of the sensor assembly 402 is aligned with the writing surface.

Figure 8C:
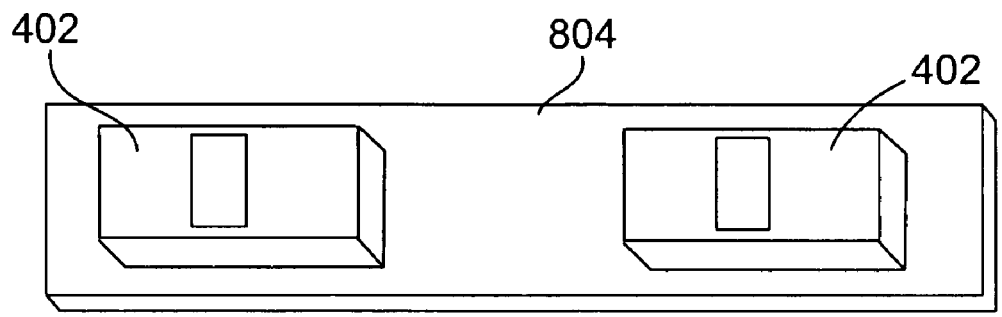
FIGS. 8C-8D are perspective views of sensor-lens assemblies.
Figure 8D:
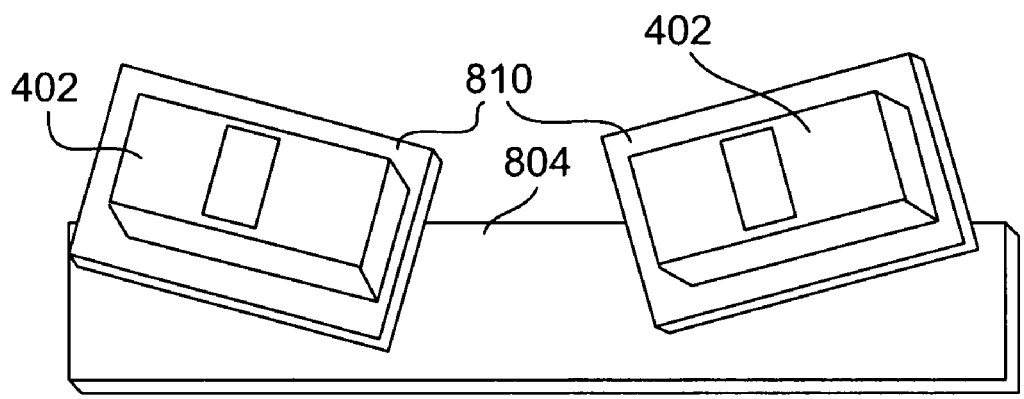

In some examples, details of which components can be rotated and to what extent depend on the construction of the sensor assemblies. If both sensor assemblies 402 are directly attached to a single circuit board 804, as shown in FIG. 8C, it may be difficult to precisely position the sensors, or to position them at the desired angle. In such cases, rotating the lenses 302 within the assemblies 402, as described with reference to FIG. 5, may be the most practical way to assure the required field of view. If the sensor assemblies 402 include or are attached to individual circuit boards, such as daughter boards, as shown in FIG. 8D, it may be more practical to position the lenses 302 parallel to the sensors 210 within the assemblies 402 and position the individual assemblies 402 at the required angles.

When the frame 806 is used to control the position of the lens 302 relative to the sensor array 210, manufacturing tolerances of the frame 806 need to be such that the lens 302 and sensor array 210 can be reliably positioned within whatever tolerance is required by their sensitivity, focus, and other parameters. Using the frame 806 to position the sensor array 210, as shown in FIG. 8B, rather than using the circuit board 804 to position the sensor array 210 may be useful in assuring proper alignment of the lens 302 and sensor array 210, especially in cases where the circuit board 804 is difficult to accurately position. It may also be beneficial to mount the frame 806 directly to an opening in the device where the sensors are to be used, rather than mounting the frame 806 to the printed circuit board 804 or other component part. In some examples, tolerances in the frame of 0.025 mm have been found suitable to assure proper positioning of a linear sensor array and a spherical lens. Tolerances of 0.1 mm may be too great to allow accurate positioning of a spherical lens, but may be sufficient for a cylindrical lens.

Figure 9:
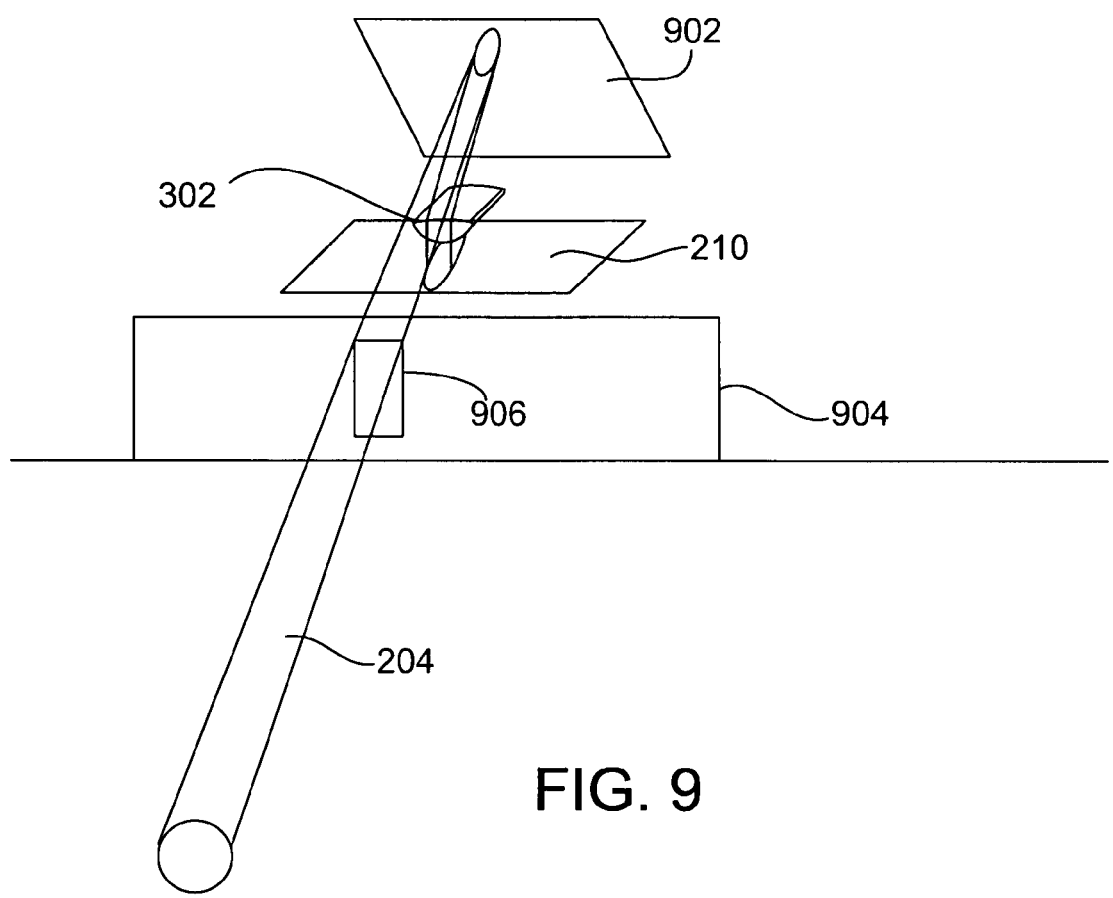
FIGS. 9-11 are schematic perspective views of light passing through sensor-lens assemblies.

In some examples, the sensors may be placed in-plane with the writing surface, as shown in FIG. 9. In such a case, mirrors 902 or other reflective surfaces may be positioned between the writing instrument and the sensor arrays 210 to direct incident light 204 onto the lens 302 and sensor array 210. A barrier 904 with an opening 906 for each sensor may be used as an optical slit to position the light onto the sensor array 210 instead of or in addition to a lens. Infrared filters can be installed in the opening 906 to reduce the amount of ambient light reaching the sensor arrays 210. Rather than using separate filters, in some examples, it is possible to make the lens itself from a material that will filter out ambient visible light and transmit primarily infrared light without compromising the ability of the lens to focus the light. Such materials are well known in the art.

Figure 10:
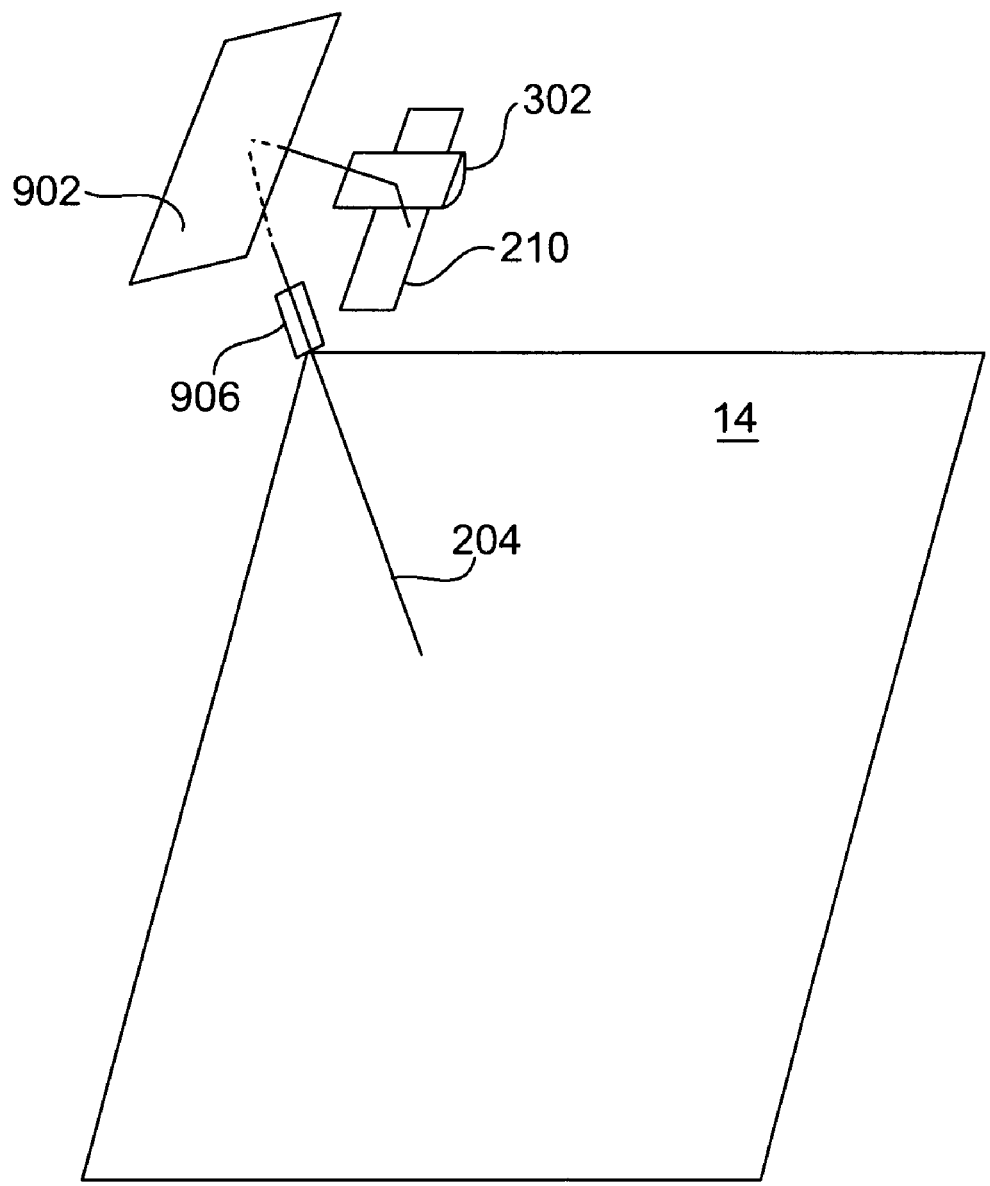
Figure 11:
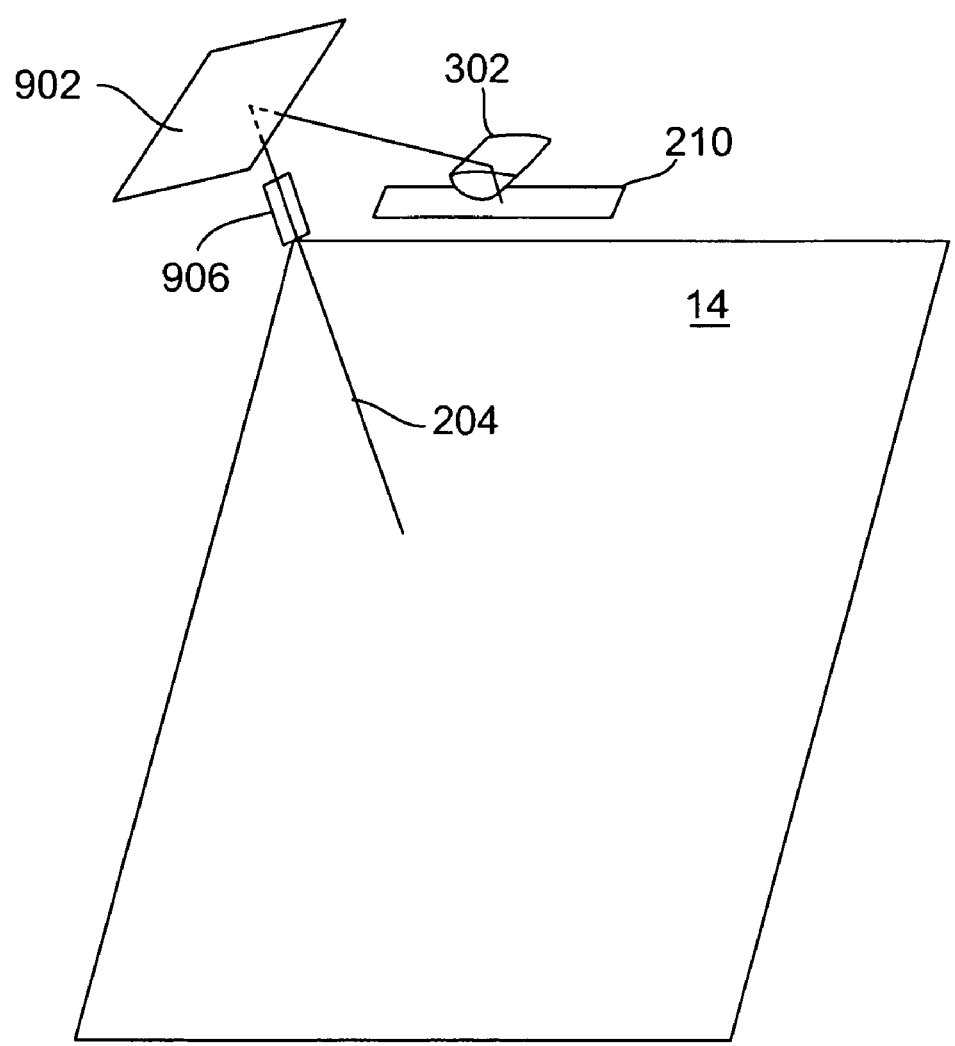

As shown in FIG. 10, the angle of the mirrors 902 may be varied, allowing for the sensor arrays 210 to not be in a direct line-of-sight from the light source and through the opening 906. For example, the opening 906 could be positioned at the corner of the writing surface 14, with the sensor array 210 positioned perpendicular to the edge 23, and the mirror 902 positioned to direct light from the opening 906 to the lens 302 and sensor array 210. This allows a 90° field of view to completely cover the entire writing surface, eliminating the blind spot 400b in FIG. 4A. Alternatively, the mirror 902 maybe positioned to divert light 204 through opening 906 to sensor 210 positioned parallel to edge 23 of the writing surface 14 as shown in FIG. 11. Various other divergences of light in three dimensions are feasible.

Figure 12A:
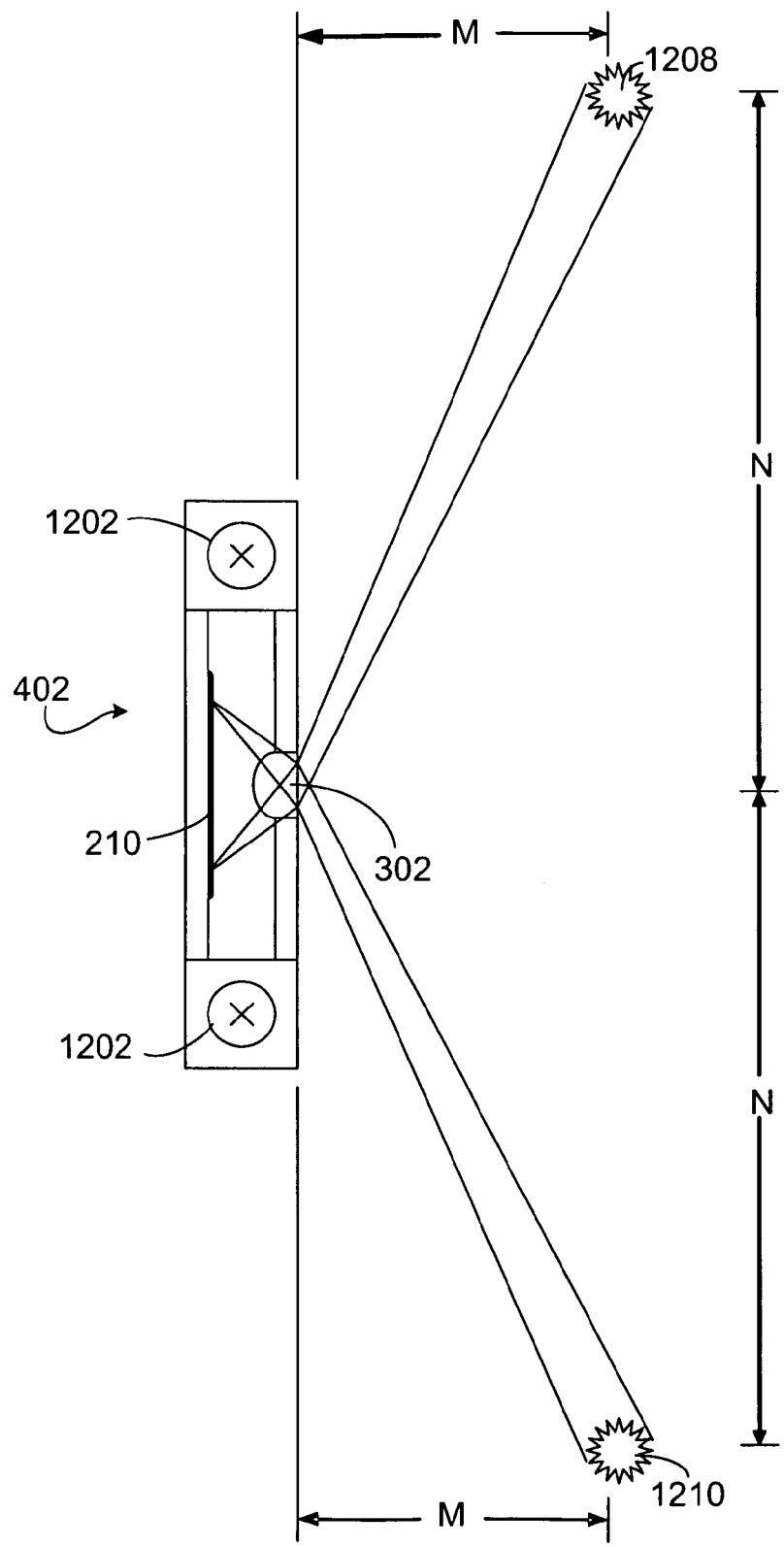
Figure 12B:
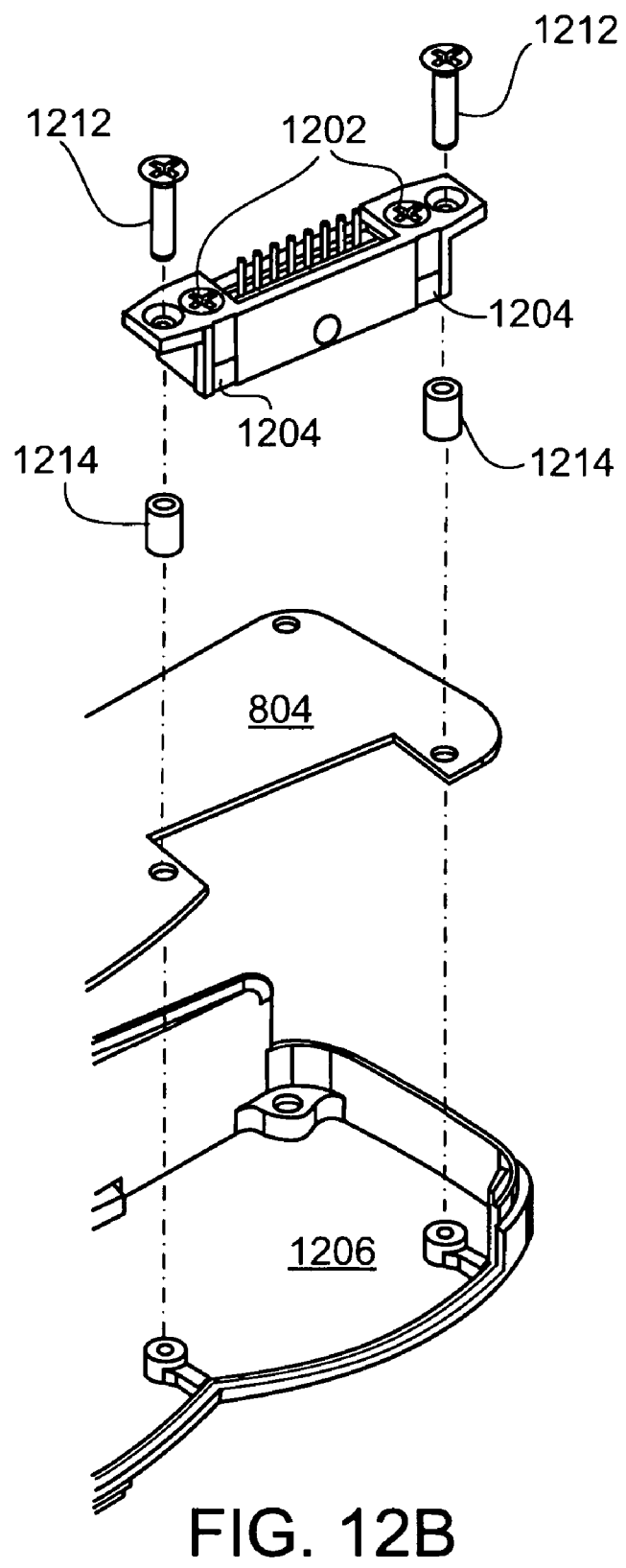
FIG. 12B is a perspective exploded view of a sensor-lens assembly.

Once the sensor assemblies are assembled, either before or after being mounted in a device, such as a self-contained pen cap or the frame of a tablet computer, it may be necessary to further adjust their alignment. In some examples, as shown in FIGS. 12A and 12B, adjustment screws 1202 are used to finely position the lens 302 and sensor array 210 within each assembly 402. Bushings 1204 maintain tension against the force of the screws 1202, and together with the screws hold the components in position. Alignment may be performed using a light source and a display (not shown) connected to the output of the sensor array 210 within the assembly 402, for example, by placing the light source in known locations 1208, 1210 at a distance M from the front plane of the sensor assembly 402 and a distance N to either side of the center of the sensor assembly 402, and adjusting the screws 1202 until the appropriate signal is detected. In a manufacturing environment, the light may be provided by fixed sources integrated into an alignment tool. The adjustment screws 1202 may allow the sensor to be positioned both right-to-left (relative to its own center) and up and down, to assure that the sensor array is parallel to the edge of the paper (or at whatever angle is appropriate for the design). The specific values of M and N and the amount of adjustment necessary will depend on such factors as the tolerances of the individual assemblies and of the installation of the assemblies into the device. Screws 1212 and spacers 1214 secure the sensor assembly into a device 1206.

A similar process can be used to compute calibration parameters after the parts are assembled. As the pen is placed in each of a series of pre-determined locations, the response of the sensor arrays 210 is measured. These measurements are used to compute calibration parameters that can then be stored in a memory, for example, a ROM, of the device and used to adjust the measurements of the sensor arrays when the device is in use.

Although we have referred to spherical and cylindrical lenses above, other shapes of lenses could be used. Depending on the lens used, the focused spot or line could have characteristics (such as being slightly out of focus or having a useful profile of intensity from one side to the other) that would be useful in connection with sensing light at the sensor array. In addition, a cylindrical lens need not have a constant cross-sectional shape and size along its length. Aspherical lenses could also be used, for example, to flatten the focal plane of the lens so that more of the sensor array is in the region where the light is tightly focused. Fresnel lenses may be used in place of other types of lenses, for example, to decrease the space required for the lens. In some examples, pin holes or slits may be used in place of having any lenses at all or in addition to lenses. Although we refer to the lens focusing the light in our discussion above, the lens could also be arranged to concentrate the light without fully focusing it on the array.

Although we have described an example of an array that is a single row of pixel sensors of the same size and shape, the array could be more complex and could include pixels of different sizes and shapes, multiple rows or pixels, or other patterns of pixels arranged along the length of the sensor.

Other variations are within the scope of the following claims. For example, the writing surface could be a whiteboard used with markers or a drawing pad sensitive to pressure or to a magnetic stylus.

What is claimed is:

1. An apparatus comprising
an array of sensitive pixel elements configured to generate signals related to sensed light that is associated with writing being done by a user, and
an optical system to concentrate light from a light source across more than one sensitive pixel element of the array,
the signals from the sensitive pixel elements of the array on which the light is concentrated being useful to compute a position of the light source, with a sub-pixel resolution representative of the concentrated light on the array of sensitive pixel elements and to determine the position of the light source based on the sub-pixel resolution, which is a higher resolution than the resolution of the array of sensitive pixel elements.

2. The apparatus of claim 1 in which the array comprises a row of pixels along a length of the array.

3. The apparatus of claim 1 in which the more than one sensitive pixel element are sensitive to infrared light.

4. The apparatus of claim 1 in which the array of more than one sensitive pixel element comprises a lateral position measurement detector.

5. The apparatus of claim 4 in which the lateral position measurement detector comprises a CMOS linear array.

6. The apparatus of claim 4 in which the lateral position measurement detector comprises a CMOS 2D array.

7. The apparatus of claim 3 in which the lateral position measurement detector comprises a CCD linear array.

8. The apparatus of claim 4 in which the lateral position measurement detector comprises a 2D array.

9. The apparatus of claim 4 in which the lateral position measurement detector comprises a position sensing detector (PSD).

10. The apparatus of claim 1 in which the light comprises infrared light.

11. The apparatus of claim 1 in which the optical system comprises a lens.

12. The apparatus of claim 11 in which the lens comprises a single spherical lens.

13. The apparatus of claim 11 in which the lens has a cross-section that is constant along a length of the lens.

14. The apparatus of claim 13 in which the lens comprises a single cylindrical lens.

15. The apparatus of claim 11 in which the lens comprises a single aspheric lens.

16. The apparatus of claim 1 in which the optical system is configured to concentrate the light into an elongated shape on the array.

17. The apparatus of claim 16 in which the shape is a line.

18. The apparatus of claim 1 in which the optical system is further configured to focus the light onto the array.

19. The apparatus of claim 1 in which the optical system comprises an opening in an optically opaque material.

20. The apparatus of claim 1 in which the optical system comprises a combination of a transparent refractive lens and an opening in an optically opaque material.

21. The apparatus of claim 1 in which the optical system comprises a series of two or more lenses.

22. The apparatus of claim 1 in which the optical system comprises a pinhole aperture.

23. The apparatus of claim 1 in which the optical system comprises a slit aperture.

24. The apparatus of claim 1 in which the optical system comprises a single Fresnel lens.

25. The apparatus of claim 1 in which the optical system comprises a series of two or more Fresnel lenses.

26. The apparatus of claim 1 in which the optical system comprises a single binary lens.

27. The apparatus of claim 1 in which the optical system comprises a series of two or more binary lenses.

28. The apparatus of claim 1 in which the optical system comprises a reflective surface positioned to reflect light from the light source onto a lens.

29. The apparatus of claim 1 in which the optical system comprises a material to transmit infrared light and not transmit other light.

30. The apparatus of claim 1 in which the computed position of the light source is a vertical projection of a position of the light source onto a plane defined by the writing surface.

31. The apparatus of claim 1 also comprising
a second array of sensitive pixel elements configured to generate signals related to the sensed light, and
the optical system being configured also to concentrate light from the light source across a section of the second array of sensitive pixel elements,
the signals from the first and second arrays being useful to compute a position of the light source in two dimensions, with a sub-pixel resolution representative of the concentrated light on the arrays of sensitive pixel elements and to determine the position of the light source based on the sub-pixel resolution, which is a higher resolution than the resolution of either array of sensitive pixel elements.

32. The apparatus of claim 31 in which the computed position of the light source is a vertical projection of a position of the light source onto a plane defined by the writing surface.

33. The apparatus of claim 31 in which the optical system comprises at least one opening in an optically opaque material.

34. The apparatus of claim 31 in which the optical system comprises a combination of at least one transparent refractive lens and an opening in an optically opaque material.

35. The apparatus of claim 31 in which the first array and the optical system together comprise a first sensor, and the second array and the optical system together comprise a second sensor,
in which the first and second sensors are each rotated oriented such that the arrays are not in a common plane.

36. The apparatus of claim 35 in which the first and second sensors are positioned such that the sensors can detect the light source as it is moved over a writing surface.

37. The apparatus of claim 36 in which the writing surface comprises an area corresponding to a standard size of paper.

38. The apparatus of claim 36 in which the writing surface comprises a whiteboard.

39. The apparatus of claim 36 in which the writing surface comprises a drawing pad.

40. The apparatus of claim 35 in which the first and second sensors are located about 120 mm apart and are each oriented about twelve degrees relative to the other, as measured from parallel lines through the two sensors.

41. The apparatus of claim 35 in which the first and second sensors are located at adjacent corners of a writing surface, and each oriented about forty-five degrees relative to an adjacent edge of the writing surface.

42. The apparatus of claim 35 also comprising a third and forth sensor, in which the sensors are located at four corners of a writing surface and are each oriented about forty-five degrees relative to an adjacent edge of the writing surface.

43. The apparatus of claim 35 also comprising a third and forth sensor, in which the sensors are located along four sides of a writing surface.

44. The apparatus of claim 31 also comprising a structure configured to hold the arrays, and the optical system to permit detecting the position of the light source as it is moved over a writing surface.

45. The apparatus of claim 44 in which the structure comprises a pen holder.

46. The apparatus of claim 44 in which the structure comprises a pen cap.

47. The apparatus of claim 45 in which the light source is associated with a writing instrument, and the pen holder is configured to accommodate the writing instrument.

48. The apparatus of claim 45 in which the pen holder is configured to be attached to an edge of the writing surface.

49. The apparatus of claim 44 in which the structure comprises a body of a computer, and the writing surface comprises a screen of the computer.

50. An apparatus comprising
an array of sensitive pixel elements configured to generate signals related to sensed light that is associated with writing being done by a user, the array being characterized by a plane defined by the sensitive pixel elements, an axis through the sensitive pixel elements, and a center point between equal sets of the sensitive pixel elements, and
a lens to concentrate light from a light source onto the array of sensitive pixel elements, the lens being characterized by an axis through its center and positioned with its axis offset from the center point of the array,
the signals from the sensitive pixel elements of the array on which the light is concentrated being useful to compute a position of the light source, with a sub-pixel resolution representative of the concentrated light on the array of sensitive pixel elements and to determine the position of the light source based on the sub-pixel resolution, which is a higher resolution than the resolution of the array of sensitive pixel elements.

51. The apparatus of claim 50 in which the lens is also characterized by a curved surface and a flat surface, and also positioned such that the flat surface is not parallel to the plane of the array.

52. An apparatus comprising
an array of sensitive pixel elements configured to generate signals related to sensed light that is associated with writing being done by a user, the array being characterized by a plane defined by the sensitive pixel elements, an axis through the sensitive pixel elements, and a center point between equal sets of the sensitive pixel elements, and
a lens to concentrate light from a light source onto the array of sensitive pixel elements, the lens having a curved surface and a flat surface, and positioned such that the flat surface is not parallel to the plane of the array,
the signals from the sensitive pixel elements of the array on which the light is concentrated being useful to compute a position of the light source, with a sub-pixel resolution representative of the concentrated light on the array of sensitive pixel elements and to determine the position of the light source based on the sub-pixel resolution, which is a higher resolution than the resolution of the array of sensitive pixel elements.

53. The apparatus of claim 52 in which the lens is cylindrical.

54. The apparatus of claim 53 in which an axis through the cylindrical shape of the lens is in a plane perpendicular to the axis of the sensitive pixel elements.

55. The apparatus of claim 52 also comprising an opening in an optically opaque material to control an amount of light reaching the lens.

56. The apparatus of claim 52 also comprising
a second array of sensitive pixel elements configured to generate signals representative of the sensed light, the second array being characterized by a plane defined by the sensitive pixel elements, an axis through the sensitive pixel elements, and a center point between equal sets of the sensitive pixel elements, and
a second lens to concentrate light from the light source onto the second array of sensitive pixel elements, the second lens having a curved surface and a flat surface, and positioned such that the flat surface is not parallel to the plane of the second array,
the signals from the sensitive pixel elements of the first and second arrays being useful to compute a position of the light source in two dimensions, with a sub-pixel resolution representative of the concentrated light on the arrays of sensitive pixel elements and to determine the position of the light source based on the sub-pixel resolution, a higher resolution than the resolution of either array of sensitive pixel elements.

57. An apparatus comprising
a writing surface,
an array of sensitive pixel elements configured to generate signals related to sensed light that is associated with writing being done by a user,
a lens to concentrate light from a light source in a shape other than a spot onto the array of sensitive pixel elements, and
a reflective surface positioned to reflect light from the light source onto the lens, when the light source is near the writing surface,
the signals from the sensitive pixel elements of the array being useful to compute a position of the light source, with a sub-pixel resolution representative of the concentrated light on the array of sensitive pixel elements and to determine the position of the light source based on the sub-pixel resolution, which is a higher resolution than the resolution of the array of sensitive pixel elements.

58. The apparatus of claim 57 also comprising an optically opaque barrier positioned between the writing surface and the reflective surface, a portion of the barrier defining an opening positioned to admit light from the light source when the light source is near the writing surface.

59. A method comprising
using two optical sensors separated by a lateral distance to generate a set of signals usable to reconstruct a position of a light source that is associated with a writing instrument being used by a user, and
using the signals to compute a measurement of a position in two dimensions of the light source near a writing surface, in which using the optical sensors includes using an optical system to concentrate light from the light source in a shape other than a spot onto an array of sensitive pixel elements, and in which the reconstructed position of the light source has a sub-pixel resolution representative of the concentrated light on the array of sensitive pixel elements, the sub-pixel resolution being a higher resolution than the resolution of the array of sensitive pixel elements.

60. The method of claim 59 in which computing the measurement comprises using a quasi-triangulation algorithm.

61. The method of claim 59 in which computing the measurement comprises using calibrated parameters.

62. The method of claim 59 in which computing the measurement comprises using a lookup table.

63. The method of claim 59 in which computing the measurement comprises using a polynomial approximation.

64. The method of claim 59 also comprising using the two optical sensors to generate a second set of signals usable to reconstruct a position of a second light source that is associated with a second position along a length of the writing instrument, in which the reconstructed position of the second light source has a higher resolution than the resolution of the array of sensitive pixel elements.

and using the first and second sets of signals to compute a measurement of an angle between the writing instrument and the writing surface.

65. The method of claim 64 also comprising using the first and second sets of signals to compute a position in two dimensions of a tip of the writing instrument on the writing surface.

\* \* \* \* \*